United States Patent
Morita et al.

(10) Patent No.: US 9,006,954 B2
(45) Date of Patent: Apr. 14, 2015

(54) LUNDELL ROTARY MACHINE

(71) Applicants: Masao Morita, Chiyoda-ku (JP); Masaya Inoue, Chiyoda-ku (JP); Yoichi Kuroda, Chiyoda-ku (JP); Moriyuki Hazeyama, Chiyoda-ku (JP); Kanji Shinkawa, Chiyoda-ku (JP)

(72) Inventors: Masao Morita, Chiyoda-ku (JP); Masaya Inoue, Chiyoda-ku (JP); Yoichi Kuroda, Chiyoda-ku (JP); Moriyuki Hazeyama, Chiyoda-ku (JP); Kanji Shinkawa, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/368,415

(22) PCT Filed: Jan. 22, 2013

(86) PCT No.: PCT/JP2013/051161
§ 371 (c)(1),
(2) Date: Jun. 24, 2014

(87) PCT Pub. No.: WO2013/111730
PCT Pub. Date: Aug. 1, 2013

(65) Prior Publication Data
US 2014/0346913 A1    Nov. 27, 2014

(30) Foreign Application Priority Data
Jan. 25, 2012   (JP) ................. 2012-012873

(51) Int. Cl.
*H02K 1/22*    (2006.01)
*H02K 1/24*    (2006.01)
*H02K 21/04*   (2006.01)

(52) U.S. Cl.
CPC ............... *H02K 1/223* (2013.01); *H02K 1/243* (2013.01); *H02K 21/042* (2013.01); *H02K 21/044* (2013.01)

(58) Field of Classification Search
USPC .............. 310/263, 156.66, 156.69, 112–114
IPC ............................. H02K 21/044,1/243, 3/528
See application file for complete search history.

(56) References Cited

U.S. PATENT DOCUMENTS

| | | | | |
|---|---|---|---|---|
| 4,882,515 | A * | 11/1989 | Radomski | 310/263 |
| 5,270,604 | A * | 12/1993 | Sandel et al. | 310/263 |
| 5,955,807 | A * | 9/1999 | Kajiura et al. | 310/156.66 |
| 2005/0006978 | A1 * | 1/2005 | Bradfield | 310/263 |
| 2005/0179334 | A1 | 8/2005 | Yoshinaga | |

FOREIGN PATENT DOCUMENTS

| | | |
|---|---|---|
| JP | 6 22518 | 1/1994 |
| JP | 2002 171731 | 6/2002 |
| JP | 2005 210855 | 8/2005 |

OTHER PUBLICATIONS
International Search Report Issued Apr. 23, 2013 in PCT/JP13/051161 Filed Jan. 22, 2013.

* cited by examiner

*Primary Examiner* — Dang Le
(74) *Attorney, Agent, or Firm* — Oblon, McClelland, Maier & Neustadt, L.L.P.

(57) ABSTRACT

A rotor includes: a plurality of first magnetic pole members that are disposed such that first end portions and second end portions are respectively coupled magnetically and mechanically to a first magnetic end plate and to a second magnetic end plate and so as to be separated from a magnetic intermediate plate magnetically; a plurality of second magnetic pole members that are disposed such that intermediate portions are coupled magnetically and mechanically to the magnetic intermediate plate and so as to be separated from each of the magnetic end plates magnetically; a plurality of permanent magnets that are disposed between the first and second magnetic pole members in a circumferential direction; and a nonmagnetic holding body for separating the first magnetic pole members magnetically from the magnetic intermediate plate, and for separating the second magnetic pole members magnetically from the magnetic end plates.

6 Claims, 24 Drawing Sheets

LUNDELL ROTARY MACHINE

TECHNICAL FIELD

The present invention relates to a Lundell rotary machine.

BACKGROUND ART

Conventionally, in order to enable increased output, alternators have been proposed that include: a tandem rotor in which two core segments are joined to each other so as to line up axially and in which a field coil is disposed separately inside each of the core segments; and a stator that surrounds the rotor (see Patent Literature 1, for example).

CITATION LIST

Patent Literature

[Patent Literature 1]
Japanese Patent Laid-Open No. HEI 6-22518 (Gazette)

SUMMARY OF THE INVENTION

Problem to be Solved by the Invention

However, among portions of the stator that face the rotor, because magnetic flux does not interlink in portions that face a boundary between each of the core segments, alternator output is reduced.

The present invention aims to solve the above problems and an object of the present invention is to provide a Lundell rotary machine that enables increases in efficiency and increases in output.

Means for Solving the Problem

In order to achieve the above object, according to one aspect of the present invention, there is provided a Lundell rotary machine including: a tubular stator that has stator magnetic poles; a rotor that has rotor magnetic poles that face the stator magnetic poles and that can be coupled magnetically, and that is rotated relative to the stator inside the stator; and a pair of magnetic field coils that are disposed radially inside the rotor magnetic poles, and that generate magnetic flux inside the stator and inside the rotor, wherein the rotor includes: a pair of first and second magnetic end plates that are disposed so as to be separated from each other in an axial direction; a magnetic intermediate plate that is disposed between the pair of magnetic end plates in the axial direction, and that is also disposed between the pair of field coils in the axial direction; a plurality of first magnetic pole members that extend axially, and that are disposed so as to be spaced apart circumferentially from each other such that first end portions and second end portions are respectively coupled magnetically and mechanically to the first magnetic end plate and to the second magnetic end plate and so as to be separated from the magnetic intermediate plate magnetically; a plurality of second magnetic pole members that extend axially, that are disposed so as to be spaced apart circumferentially from each other such that intermediate portions are coupled magnetically and mechanically to the magnetic intermediate plate and so as to be separated from each of the magnetic end plates magnetically, that are respectively inserted between the first magnetic pole members, and that constitute the rotor magnetic poles together with the first magnetic pole members; a plurality of permanent magnets that are respectively disposed between the first magnetic pole members and the second magnetic pole members in a circumferential direction such that first end portions extend to the first magnetic end plate and second end portions extend to the second magnetic end plate; and a nonmagnetic holding body for separating the first magnetic pole members magnetically from the magnetic intermediate plate, and for separating the second magnetic pole members magnetically from the magnetic end plates.

Effects of the Invention

According to the present invention, a Lundell rotary machine that enables increases in efficiency and increases in output can be achieved by disposing the permanent magnets along almost an entire length of the rotor.

DESCRIPTION OF EMBODIMENTS

Preferred embodiments of the present invention will now be explained.

Embodiment 1

Figure 1:
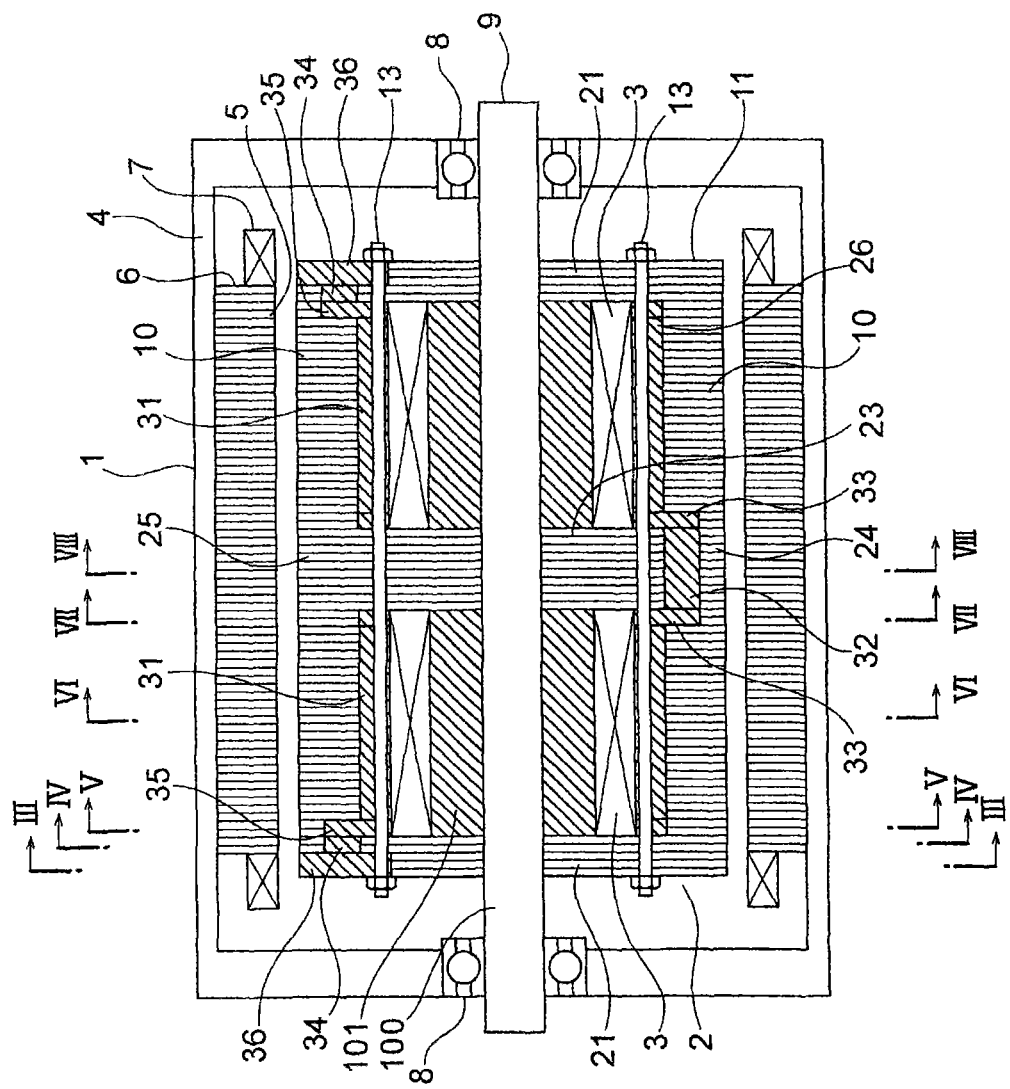
FIG. 1 is a cross section that shows a Lundell rotary machine according to Embodiment 1 of the present invention, being a cross section that is taken along Line I-I in FIG. 4.
Figure 2:
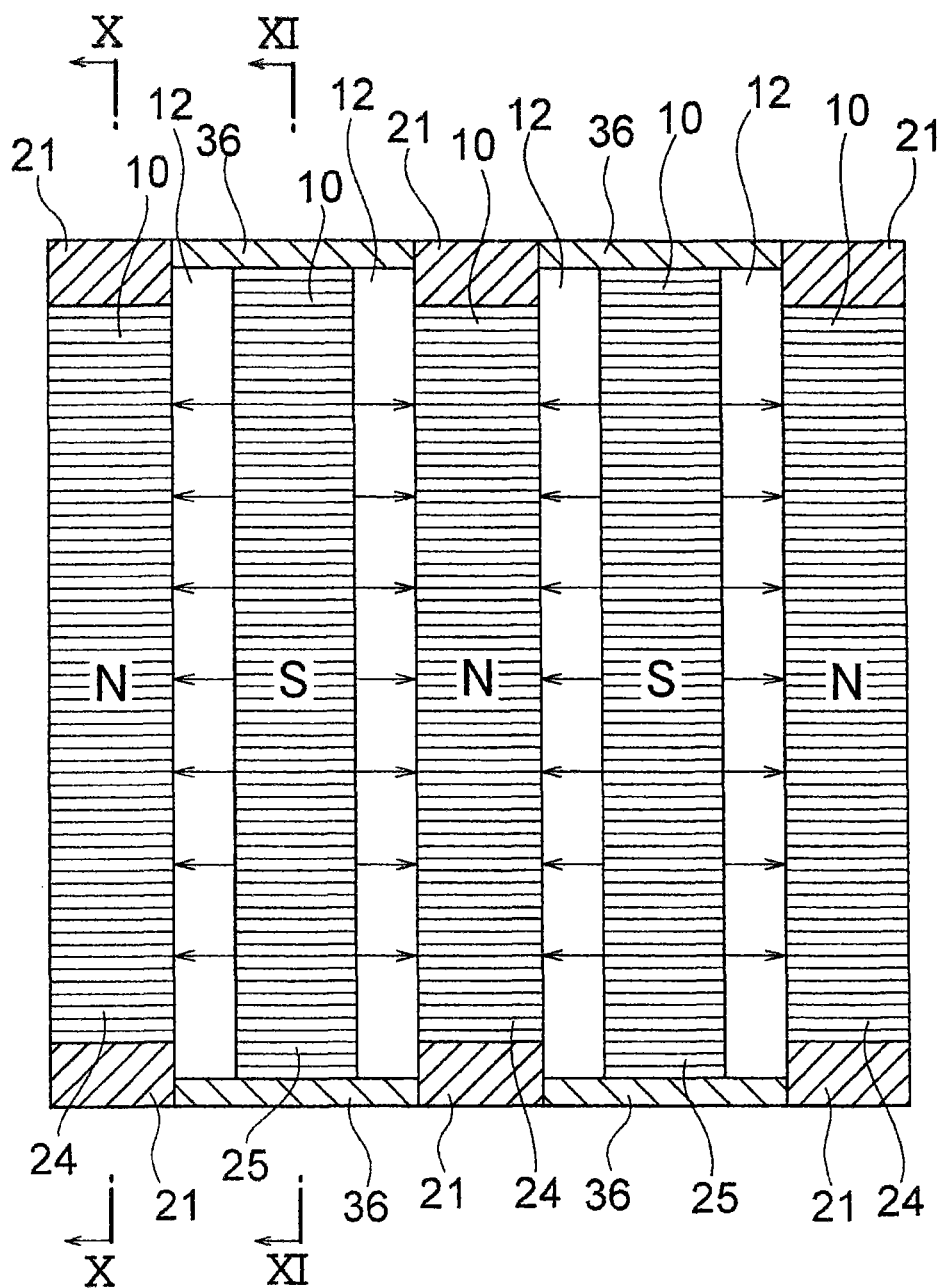
FIG. 2 is a schematic developed projection that shows an outer circumferential surface of a rotor of the Lundell rotary machine in FIG. 1.
Figure 3:
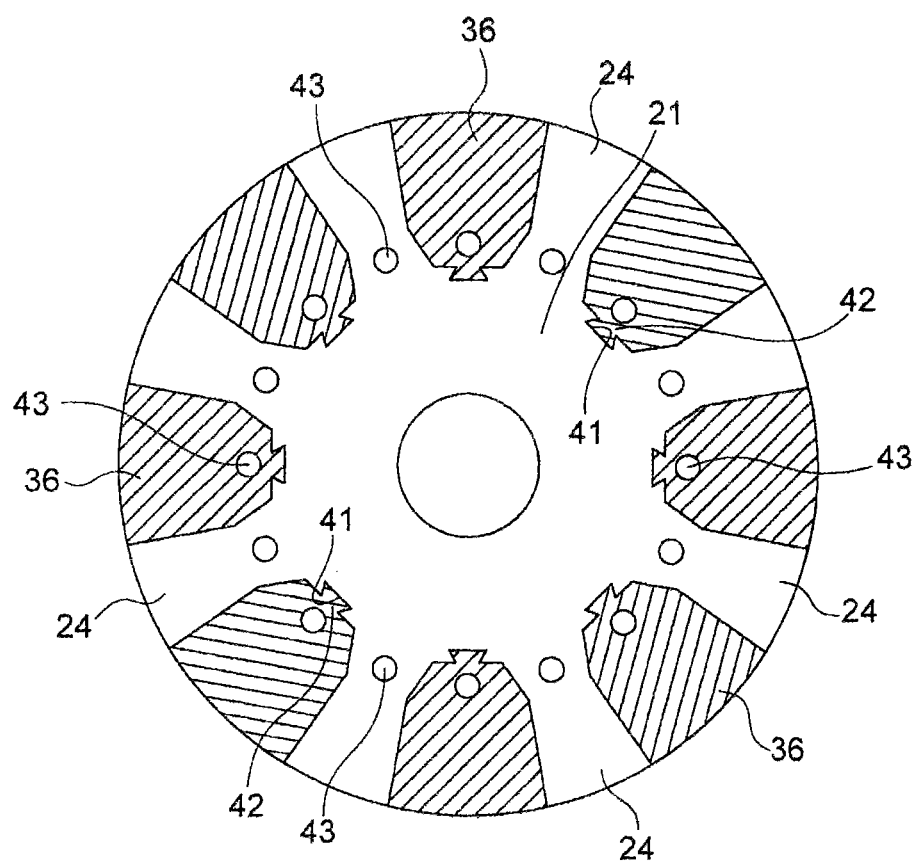
FIG. 3 is a cross section that is taken along Line III-III in FIG. 1.
Figure 4:
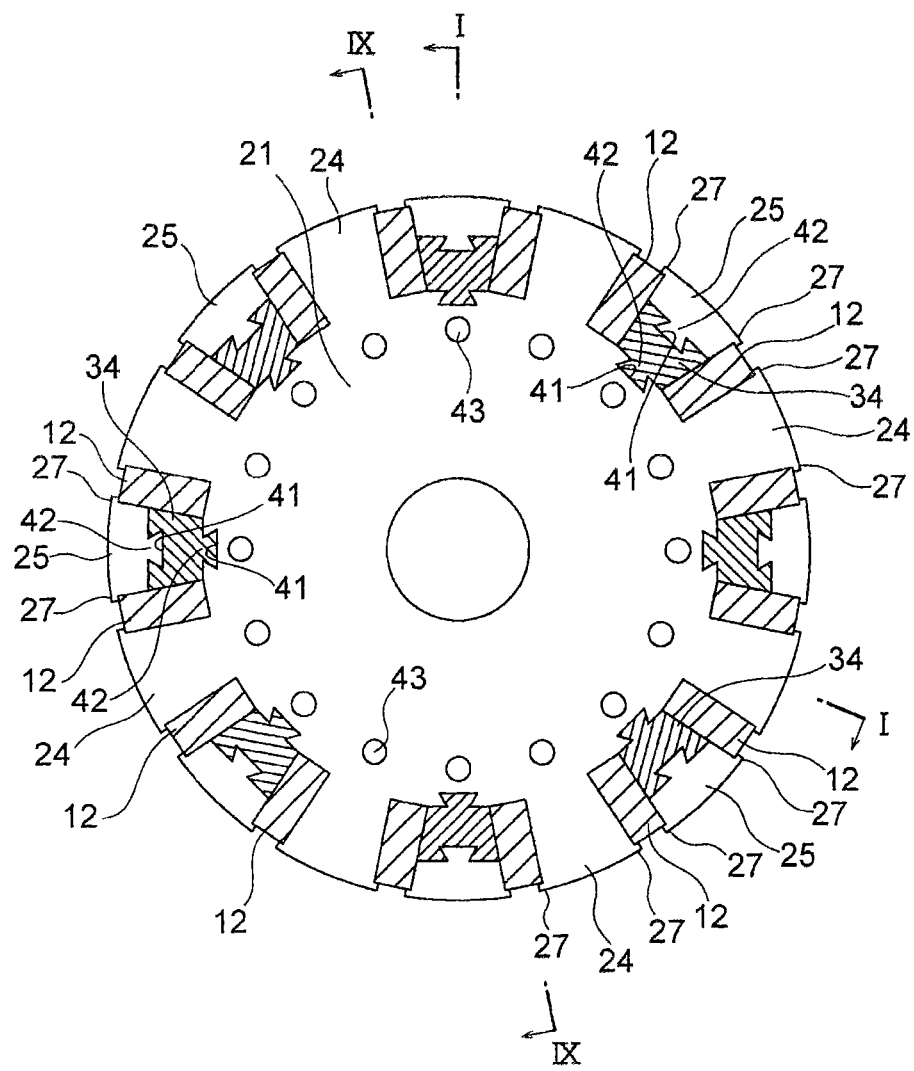
FIG. 4 is a cross section that is taken along Line IV-IV in FIG. 1.
Figure 5:
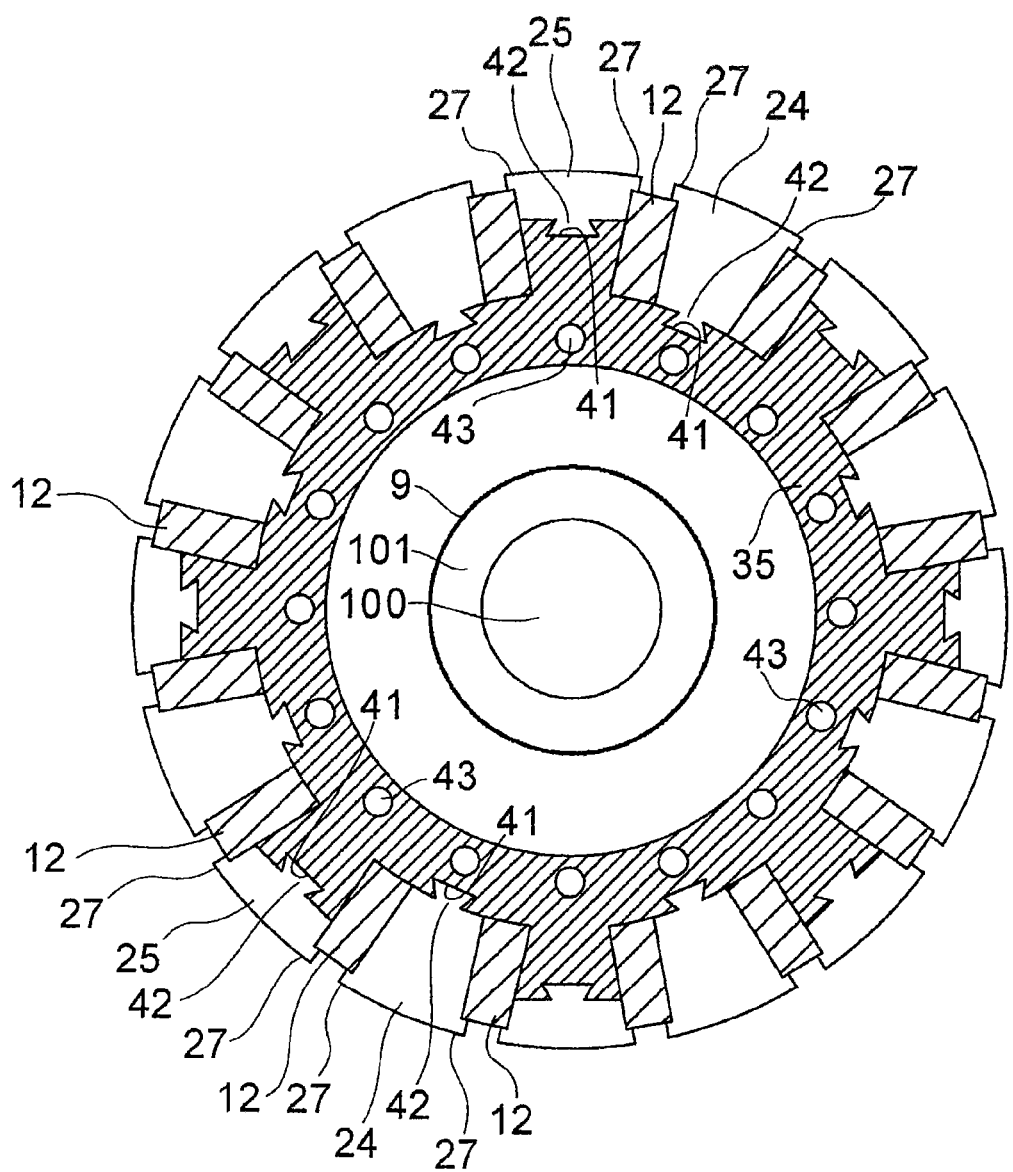
FIG. 5 is a cross section that is taken along Line V-V in FIG. 1.
Figure 6:
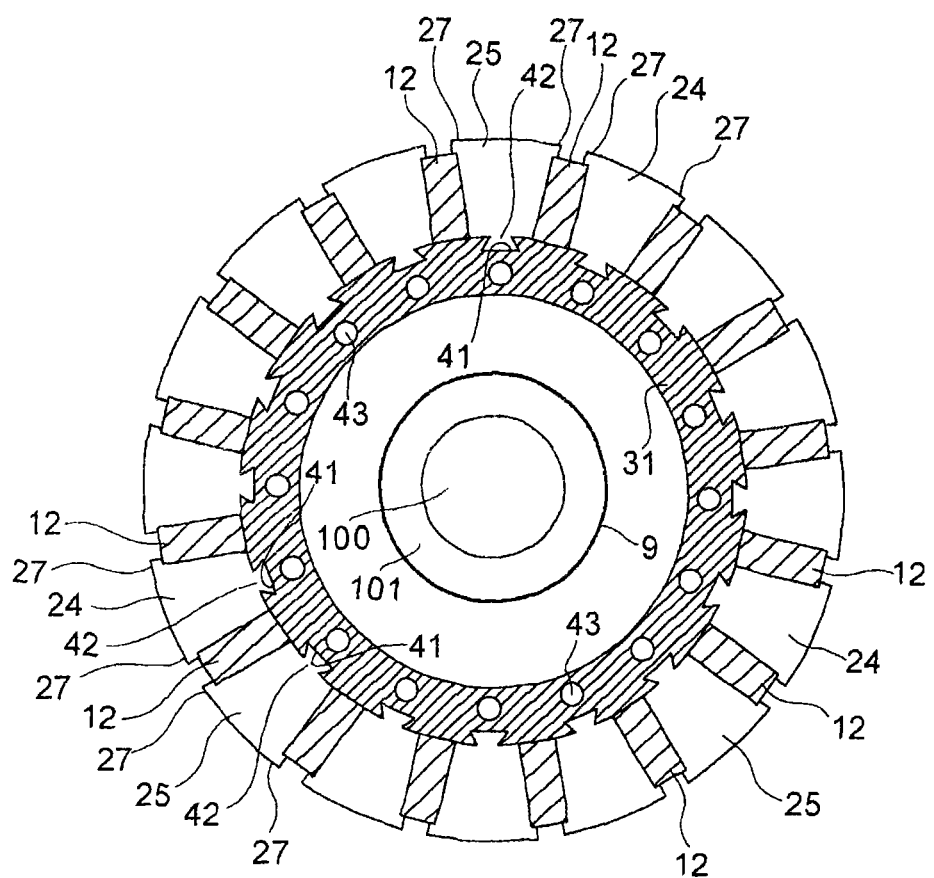
FIG. 6 is a cross section that is taken along Line VI-VI in FIG. 1.
Figure 7:
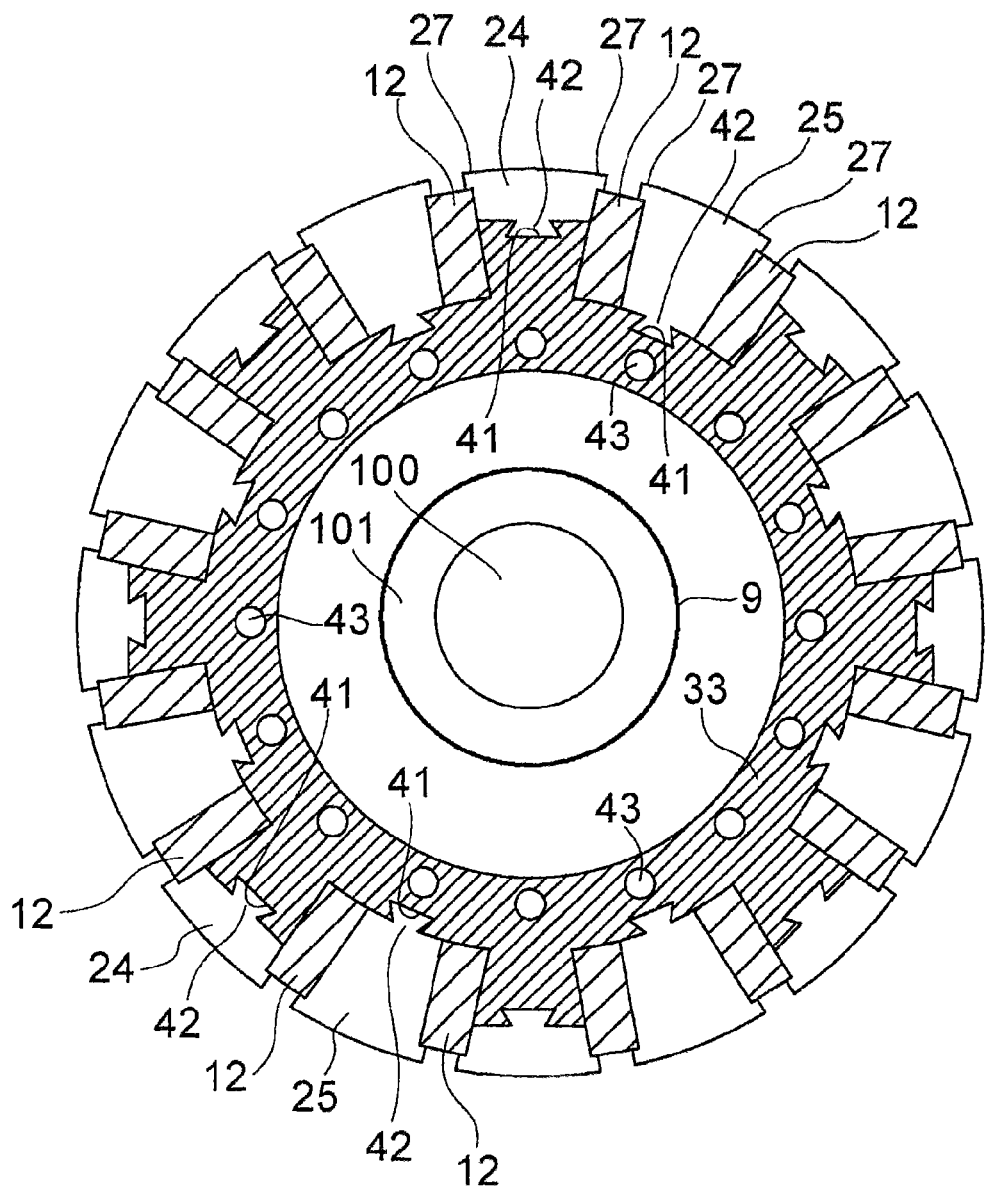
FIG. 7 is a cross section that is taken along Line VII-VII in FIG. 1.
Figure 8:
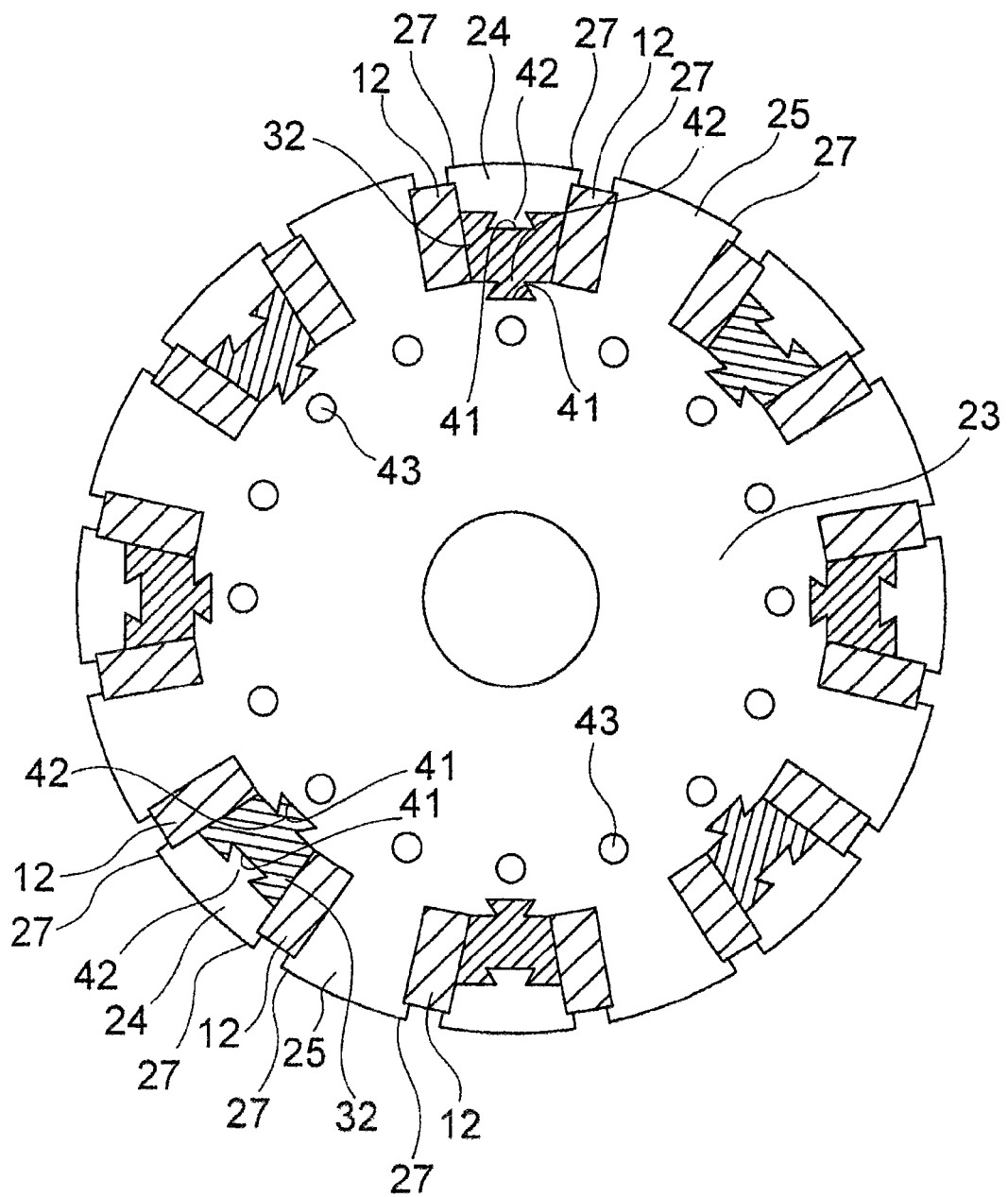
FIG. 8 is a cross section that is taken along Line VIII-VIII in FIG. 1.
Figure 9:
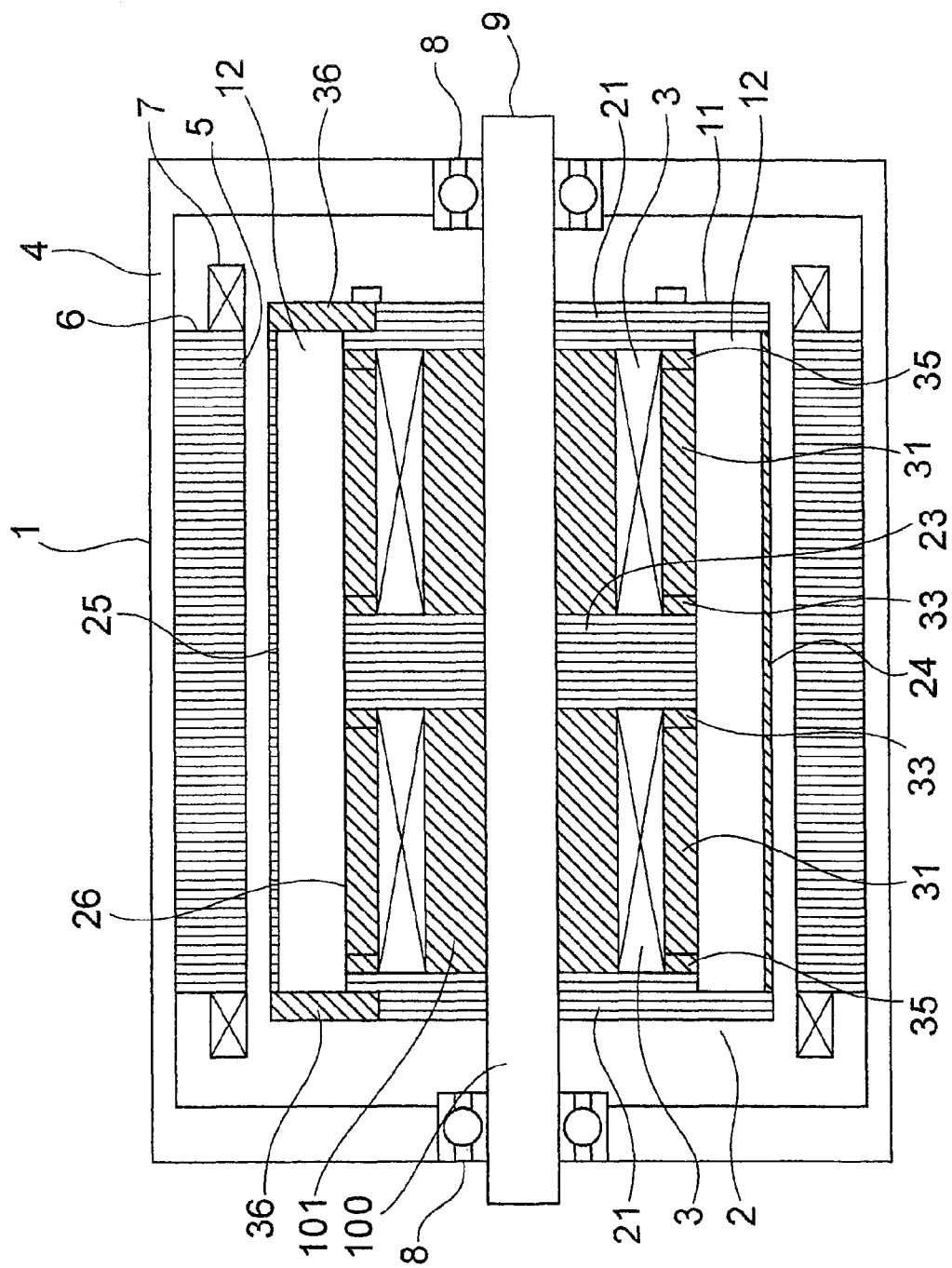
FIG. 9 is a cross section that is taken along Line IX-IX in FIG. 4.

A Lundell rotary machine according to Embodiment 1 of the present invention is shown in FIGS. 1 through 9. Specifically, FIG. 1 is a cross section that shows the Lundell rotary machine according to Embodiment 1 of the present invention, being a cross section that is taken along Line I-I in FIG. 4. FIG. 2 is a schematic developed projection that shows an outer circumferential surface of a rotor of the Lundell rotary machine in FIG. 1. In addition, FIG. 3 is a cross section that is taken along Line III-III in FIG. 1, FIG. 4 is a cross section that is taken along Line IV-IV in FIG. 1, FIG. 5 is a cross section that is taken along Line V-V in FIG. 1, FIG. 6 is a cross section that is taken along Line VI-VI in FIG. 1, FIG. 7 is a cross section that is taken along Line VII-VII in FIG. 1, and FIG. 8 is a cross section that is taken along Line VIII-VIII in FIG. 1. FIG. 9 is a cross section that is taken along Line IX-IX in FIG. 4.

The Lundell rotary machine includes: a tubular stator 1; a rotor 2 that is supported so as to be coaxial to the stator 1 so as to be rotatable inside the stator 1; and a pair of magnetic field coils 3 that are disposed inside the rotor 2, and that generate magnetic flux inside the stator 1 and inside the rotor 2.

The stator 1 has: a hollow cylindrical frame body 4; a stator core 6 that has a plurality of stator magnetic poles 5 that are disposed so as to be spaced apart circumferentially, and that is fixed to an inner circumferential surface of a cylindrical portion of the frame body 4; and a stator coil 7 that is wound onto the plurality of stator magnetic poles 5.

The rotor 2 has: a rotating shaft 9 that is supported by bearings 8 so as to be coaxial to the stator 1 so as to be rotatable relative to the stator 1; a rotor core 11 that has a plurality of rotor magnetic poles 10 that are disposed so as to be spaced apart circumferentially, that is fixed to the rotating shaft 9 by shrinkage fitting, etc., and that rotates relative to the stator 1 inside the stator 1 together with the rotating shaft 9; and a plurality of permanent magnets 12 that are disposed between the plurality of rotor magnetic poles 10 so as to change magnetic pole direction alternately, and that are magnetized circumferentially so as to reduce the magnetic flux leakage between the rotor magnetic poles 10.

The magnetic flux of the permanent magnets 12 is configured so as to interlink with the stator magnetic poles 5. If the permanent magnets 12 are produced using rare earth bonded magnets that are formed using sintered ferrite or an insulating body, eddy currents are not generated in the magnet portions, eliminating wasteful loss, and enabling increases in efficiency. The rotor magnetic poles 10 are disposed so as to be spaced apart from each other circumferentially so as to face the stator magnetic poles 5 radially, being set so as to be able to be coupled to the stator magnetic poles 5 magnetically via an air gap.

The rotor core 11 has: a pair of (first and second) magnetic end plates 21 that are fixed to the rotating shaft 9 so as to be disposed so as to be separated from each other in an axial direction of the rotor 2 (hereinafter simply "the axial direction"); a magnetic intermediate plate 23 that is fixed to the rotating shaft 9 so as to be disposed between the pair of magnetic end plates 21 in the axial direction; a plurality of first magnetic pole members 24 that extend axially, and that are disposed so as to be spaced apart circumferentially from each other such that first end portions and second end portions are respectively coupled magnetically and mechanically to the first magnetic end plate 21 and to the second magnetic end plate 21, and so as to be separated from the magnetic intermediate plate 23 magnetically; a plurality of second magnetic pole members 25 that extend axially, that are disposed so as to be spaced apart circumferentially from each other such that intermediate portions are coupled magnetically and mechanically to the magnetic intermediate plate 23 and so as to be separated from each of the magnetic end plates 21 magnetically, that are respectively inserted between the first magnetic pole members 24, and that constitute the above-mentioned rotor magnetic poles 10 together with the first magnetic pole members 24; and a nonmagnetic holding body 26 that supports the first magnetic pole members 24 and the second magnetic pole members 25 along almost an entire length thereof, for separating the first magnetic pole members 24 magnetically from the magnetic intermediate plate 23, and for separating the second magnetic pole members 25 magnetically from each of the magnetic end plates 21.

Consequently, the configuration of the rotor core 11 is a tandem configuration in which a Lundell magnetic core portion in which the first and second magnetic pole members 24 and 25 are assembled in the holding body 26 so as to extend from opposite axial ends to each other and intermesh with each other circumferentially between the first magnetic end plate 21 and the magnetic intermediate plate 23, and a Lundell magnetic core portion in which the first and second magnetic pole members 24 and 25 are assembled so as to extend from opposite axial ends to each other and intermesh with each other circumferentially between the second magnetic end plate 21 and the magnetic intermediate plate 23, are coupled in the axial direction.

The rotating shaft 9 has: a cylindrical rotating shaft main body 100 that passes through the rotor core 11 in the axial direction; and a pair of internal magnetic members 101 that are fixed to the rotating shaft main body 100, and that are respectively disposed between each of the pair of magnetic end plates 21 and the magnetic intermediate plate 23 in the axial direction. The shape of each of the internal magnetic members 101 is a cylindrical shape into which the rotating shaft main body 100 fits radially inside.

Each of the field coils 3 is disposed radially further inward than each of the first magnetic pole members 24 and each of the second magnetic pole members 25 (i.e., the rotor magnetic poles 10), and is disposed radially further outward than each of the internal magnetic members 101. The pair of magnetic field coils 3 are disposed so as to line up in the axial direction between the pair of magnetic end plates 21. In addition, the magnetic intermediate plate 23 is disposed between the pair of magnetic field coils 3. Each of the field coils 3 is fixed to the rotor core 11 so as to be rotated together with the rotor 2. An electric current is supplied to each of the field coils 3 from outside by means of slip rings (not shown) that are disposed on the rotating shaft 9 so as to be positioned closer to an axial end portion than the rotor core 11.

The magnetic intermediate plate 23 is disposed at a central position between the pair of magnetic end plates 21 in the axial direction. The rotor 2 has a symmetrical configuration relative to a plane that passes through a center of the magnetic intermediate plate 23 perpendicular to the shaft axis of the rotor 2.

Each of the magnetic end plates 21, the magnetic intermediate plate 23, each of the first magnetic pole members 24, and each of the second magnetic pole members 25 are respectively constituted by a laminated body in which a plurality of magnetic sheets are laminated in the axial direction. In the depicted example, each of the magnetic end plates 21, the magnetic intermediate plate 23, each of the first magnetic pole members 24, and each of the second magnetic pole members 25 are assembled and held firmly together with the permanent magnets 12 by being held by the holding body 26 and fastening bolts 13 that constitute fastening means that pass through and fasten them. Each of the magnetic end plates 21 and the magnetic intermediate plate 23 are fixed firmly onto the rotating shaft 9 by fitting inner circumferential edges thereof onto the rotating shaft 9.

The holding body 26 has: a cylindrical nonmagnetic member 31 that is disposed between the magnetic end plates 21 and the magnetic intermediate plate 23 in the axial direction, and that supports each of the first magnetic pole members 24 and the second magnetic pole members 25 on a radially inner side; a plurality of nonmagnetic members 32 that are interposed between the magnetic intermediate plate 23 and the first magnetic pole members 24 radially; a nonmagnetic member 33 that is interposed between the magnetic intermediate plate 23 and the first magnetic pole members 24, and that fills a space between the nonmagnetic member 31 and the nonmagnetic members 32; a plurality of nonmagnetic members 34 that are interposed between the magnetic end plates 21 and the second magnetic pole members 25 radially; a nonmagnetic member 35 that is interposed between the magnetic end plates 21 and the second magnetic pole members 25, and that fills a space between the nonmagnetic member 31 and the nonmagnetic member 34; and a plurality of nonmagnetic members 36 that are disposed axially outside each of the second magnetic pole members 25. Each of the field coils 3 is disposed radially inside the cylindrical nonmagnetic member 31.

As shown in FIGS. 1, 3, and 4, end portions of each of the first magnetic pole members 24 are formed integrally with each of the magnetic end plates 21. As shown in FIG. 3, the nonmagnetic members 36 are disposed individually between the end portions of each of the first magnetic pole members 24 circumferentially. A dovetail 42 is disposed on a radially inner portion of each of the nonmagnetic members 36. A plurality of dovetail grooves 41 with which the dovetails 42 of the nonmagnetic members 36 engage are disposed on the magnetic end plates 21. The respective nonmagnetic members 36 are fixed circumferentially and radially onto the magnetic end plates 21 by the dovetails 42 of the nonmagnetic members 36 engaging in the dovetail grooves 41 of the magnetic end plates 21. Bolt passage apertures 43 for passage of the fastening bolts 13 are respectively disposed on the magnetic end plates 21 and each of the nonmagnetic members 36. As shown in FIG. 2, each of the nonmagnetic members 36 is disposed so as to be held between each of the second magnetic pole members 25 and each of the permanent magnets 12 in the axial direction. Consequently, each of the second magnetic pole members 25 and each of the permanent magnets 12 are fixed to each other in the axial direction by being fastened together with each of the nonmagnetic members 36 by the fastening bolts 13 that are passed through the bolt passage apertures 43 of each of the nonmagnetic members 36.

As shown in FIG. 4, dovetails 42 that engage with the dovetail grooves 41 of the magnetic end plates 21 are disposed on radially inner portions of the nonmagnetic members 34, and dovetail grooves 41 with which the dovetails 42 of the second magnetic pole members 25 engage are disposed on radially outer portions of the nonmagnetic members 34. The nonmagnetic members 34 are fixed radially and circumferentially onto the magnetic end plates 21 by engagement of the dovetails 42 of the nonmagnetic members 34 into the dovetail grooves 41 of the magnetic end plates 21, and the second magnetic pole members 25 are fixed radially and circumferentially onto the nonmagnetic members 34 by engagement of the dovetails 42 of the second magnetic pole members 25 into the dovetail grooves 41 of the nonmagnetic members 34. Respective bolt passage apertures 43 for passage of the fastening bolts 13 are disposed on the magnetic end plates 21.

As shown in FIG. 5, a plurality of dovetail grooves 41 with which dovetails 42 of the first magnetic pole members 24 and dovetails 42 of the second magnetic pole members 25 engage individually are disposed on radially outer portions of the nonmagnetic member 35. The first magnetic pole members 24 and the second magnetic pole members 25 are fixed radially and circumferentially onto the nonmagnetic member 35 by the respective dovetails 42 engaging with the dovetail grooves 41 of the nonmagnetic members 35. A thickness dimensions (radial dimension) of the first magnetic pole members 24 is greater than a thickness dimension (radial dimension) of the second magnetic pole members 25 in a cross section of the rotor core 11 at a position of the nonmagnetic member 35. Respective bolt passage apertures 43 for passage of the fastening bolts 13 are disposed on the nonmagnetic member 35.

As shown in FIG. 6, a plurality of dovetail grooves 41 with which the dovetails 42 of the first magnetic pole members 24 and the dovetails 42 of the second magnetic pole members 25 engage individually are disposed on radially outer portions of the nonmagnetic member 31. The first magnetic pole members 24 and the second magnetic pole members 25 are fixed radially and circumferentially onto the nonmagnetic member 31 by the respective dovetails 42 engaging with the dovetail grooves 41 of the nonmagnetic members 31. A thickness dimension (radial dimension) of the first magnetic pole members 24 and a thickness dimension (radial dimension) of the second magnetic pole members 25 in a cross section of the rotor core 11 at a position of the nonmagnetic member 35 are identical. Respective bolt passage apertures 43 for passage of the fastening bolts 13 are disposed on the nonmagnetic member 31.

As shown in FIG. 7, a plurality of dovetail grooves 41 with which the dovetails 42 of the first magnetic pole members 24 and the dovetails 42 of the second magnetic pole members 25 engage individually are disposed on radially outer portions of the nonmagnetic member 33. The first magnetic pole members 24 and the second magnetic pole members 25 are fixed radially and circumferentially onto the nonmagnetic member 33 by the respective dovetails 42 engaging with the dovetail grooves 41 of the nonmagnetic members 33. A thickness dimension (radial dimension) of the second magnetic pole members 25 is greater than a thickness dimension (radial dimension) of the first magnetic pole members 24 in a cross section of the rotor core 11 at a position of the nonmagnetic member 33. Respective bolt passage apertures 43 for passage of the fastening bolts 13 are disposed on the nonmagnetic member 33. In other words, a cross-sectional shape of the rotor core 11 at a position of the nonmagnetic member 33 is shaped so as to be offset circumferentially by a single pitch of the rotor magnetic poles 10 relative to a cross-sectional shape of the rotor core 11 at a position of the nonmagnetic member 35.

As shown in FIG. 8, intermediate portions of each of the second magnetic pole members 25 are formed integrally with the magnetic intermediate plate 23. Dovetails 42 that engage with the dovetail grooves 41 of the magnetic intermediate plate 23 are disposed on radially inner portions of the nonmagnetic member 32, and dovetail grooves 41 with which the dovetails 42 of the first magnetic pole members 24 engage are disposed on the radially outer portions of the nonmagnetic member 32. The nonmagnetic member 32 is fixed radially and circumferentially onto the magnetic intermediate plate 23 by engagement of the dovetails 42 of the nonmagnetic member 32 into the dovetail grooves 41 of the magnetic intermediate plate 23, and the first magnetic pole members 24 are fixed radially and circumferentially onto the nonmagnetic member 32 by engagement of the dovetails 42 of the first magnetic pole members 24 into the dovetail grooves 41 of the nonmagnetic member 32. Respective bolt passage apertures 43 for passage of the fastening bolts 13 are disposed on the magnetic intermediate plate 23. In other words, a cross-sectional shape of the rotor core 11 at a position of the nonmagnetic member 32 is shaped so as to be offset circumferentially by a single pitch of the rotor magnetic poles 10 relative to a cross-sectional shape of the rotor core 11 at a position of the nonmagnetic member 34.

Figure 10:
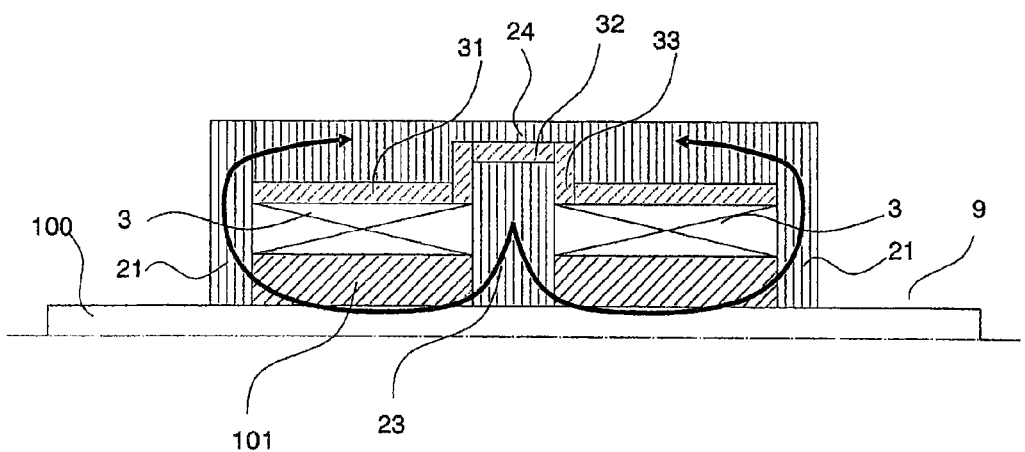
FIG. 10 is a cross section that is taken along Line X-X in FIG. 2.
Figure 11:
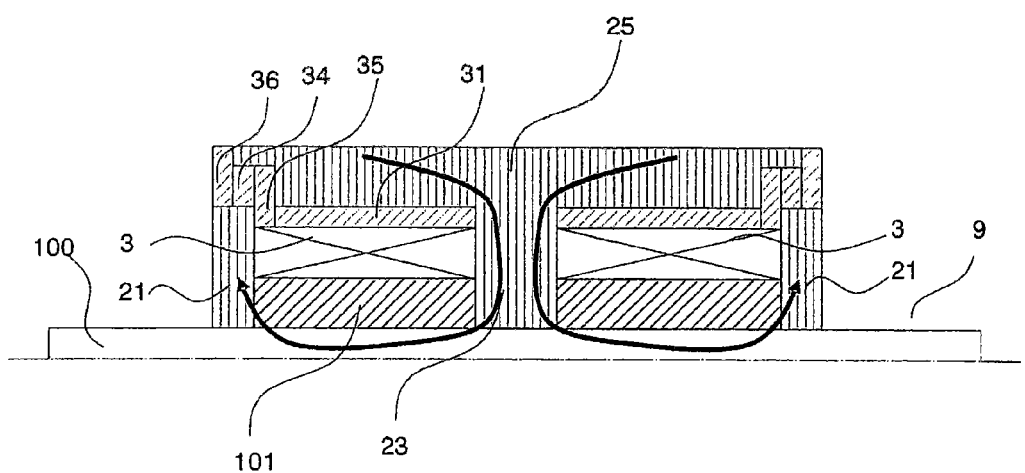
FIG. 11 is a cross section that is taken along Line XI-XI in FIG. 2.

Flow of magnetic flux that is generated by passage of the electric current to the field coils 3 will now be explained. FIG. 10 is a cross section that is taken along Line X-X in FIG. 2. FIG. 11 is a cross section that is taken along Line XI-XI in FIG. 2. Moreover, in FIGS. 10 and 11, a flow of magnetic flux in a state when North-seeking (N) poles are formed in each of the first magnetic pole members 24 and South-seeking (S) poles are formed in each of the second magnetic pole members 25 is shown. The magnetic flux that is generated by each of the field coils 3 flows through a pathway that includes each of the first magnetic pole members 24 and a pathway that includes each of the second magnetic pole members 25. As shown in FIG. 10, the magnetic flux that flows through the pathway that includes each of the first magnetic pole members 24 passes from the magnetic intermediate plate 23 sequentially through the rotating shaft 9 (i.e., the rotating shaft main body 100 and the internal magnetic members 101), the magnetic end plates 21, and each of the first magnetic pole members 24, and flows to the stator 1. N poles are thereby formed in each of the first magnetic pole members 24. As shown in FIG. 11, the magnetic flux that flows through the pathway that includes each of the second magnetic pole members 25 passes from each of the second magnetic pole members 25 sequentially through the magnetic intermediate plate 23 and the rotating shaft 9 (i.e., the rotating shaft main body 100 and the internal magnetic members 101), and flows to the magnetic end plates 21. S poles are thereby formed in each of the second magnetic pole members 25. In this example, each of the field coils 3 is disposed such that magnetic flux is produced that is symmetrical relative to the plane that passes through the center of the magnetic intermediate plate 23 perpendicular to the shaft axis of the rotor 2.

Each of the first magnetic pole members 24 and the magnetic intermediate plate 23 are respectively separated magnetically by each of the nonmagnetic members 32 and 33. Each of the second magnetic pole members 25 and each of the magnetic end plates 21 are respectively separated magnetically by each of the nonmagnetic members 34 through 36. The magnetic flux is thereby less likely to leak inside the rotor 2.

As described above, the first magnetic pole members 24 and the second magnetic pole members 25 are supported radially and circumferentially by engagement between the respective dovetails 42 of the first magnetic pole members 24 and the second magnetic pole members 25 and the dovetail grooves 41 of the holding body 26, and in addition to radially and circumferentially, are also supported in the axial direction by fastening using the fastening bolts 13.

In FIGS. 4 through 8, the permanent magnets 12 are held individually between the first magnetic pole members 24 and the second magnetic pole members 25 circumferentially. The permanent magnets 12 are held in a state of contact with side surfaces of the respective first magnetic pole members 24 and second magnetic pole members 25 that are positioned on two sides of the permanent magnets 12.

Eave portions 27 that engage the permanent magnets 12 radially are formed on radially outer corner portions of the first magnetic pole members 24 and the second magnetic pole members 25. By being engaged by the eave portions 27, the permanent magnets 12 are prevented from disengaging radially outward from between the first magnetic pole members 24 and the second magnetic pole members 25. The permanent magnets 12 are thereby supported firmly in the rotor core 11 so as to be able to tolerate centrifugal forces due to the rotation of the rotor 2.

As shown in FIGS. 2 and 9, each of the permanent magnets 12 is disposed approximately rectilinearly along almost an entire length of the rotor 2. First end portions of each of the permanent magnets 12 thereby extend to the first magnetic end plate 21, and second end portions of each of the permanent magnets 12 extend to the second magnetic end plate 21. In other words, each of the permanent magnets 12 is disposed axially so as to extend from a position of the first magnetic end plate 21, through a position of the magnetic intermediate plate 23, to a position of the second magnetic end plate 21.

Thus, the first magnetic pole members 24 and the second magnetic pole members 25 are supported by the holding body 26 by the dovetails 42 engaging with the dovetail grooves 41 that are formed axially on outer circumferential portions of each of the nonmagnetic members 31 through 35. The permanent magnets 12 are supported along almost an entire length of the rotor core 11 by the first magnetic pole members 24, the second magnetic pole members 25, and the holding body 26. In addition, an assemblage of this kind is collectively fastened by the fastening bolts 13 that pass through the rotor core 11. Consequently, sufficient mechanical strength can be achieved even if the rotor core 11 is an assemblage that has high overall rigidity, and axial dimensions thereof are large.

In a Lundell rotary machine of this kind, because the first magnetic pole members 24, which are connected to the pair of magnetic end plates 21 magnetically and mechanically, are separated magnetically from the magnetic intermediate plate 23, and the second magnetic pole members 25, which are connected to the magnetic intermediate plate 23 magnetically and mechanically, are separated magnetically from the pair of magnetic end plates 21, and the permanent magnets 12 are disposed between the first magnetic pole members 24 and the second magnetic pole members 25 circumferentially, and first end portions of the permanent magnets 12 extend to the first magnetic end plate 21, and second end portions extend to the second magnetic end plate 21, the permanent magnets 12 can be disposed along almost the entire length of the rotor core 11 from a position of the first magnetic end plate 21, through a position of the magnetic intermediate plate 23, to a position of the second magnetic end plate 21. The magnetic flux of the permanent magnets 12 can thereby be made to interlink with the stator magnetic poles 5 along almost the entire length of the rotor core 11, enabling the stator 1 to be used effectively. Increased efficiency can thereby be achieved in the Lundell rotary machine. Furthermore, because the permanent magnets 12 are also disposed at the position of the magnetic intermediate plate 23 in the axial direction, not only alleviation of magnetic saturation of both the first magnetic pole members 24 and the second magnetic pole members 25, but also alleviation of magnetic saturation of the magnetic intermediate plate 23 can be achieved, enabling increased output to be achieved in the Lundell rotary machine.

Figure 12:
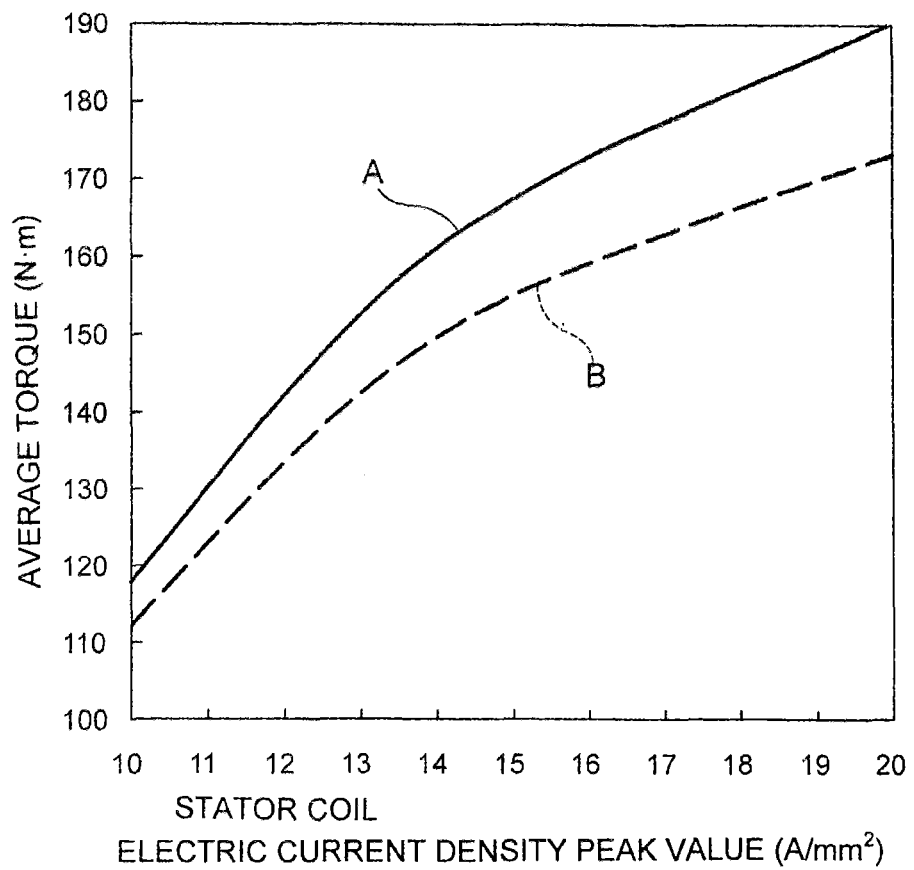
FIG. 12 is a graph that shows a relationship between average torque (N·m) and peak value of electric current density in a stator coil 7 (A/mm$^2$) for the Lundell rotary machine according to Embodiment 1 of the present invention and a Lundell rotary machine according to a comparative example for comparison with the Lundell rotary machine according to Embodiment 1, respectively.

Now, FIG. 12 is a graph that shows a relationship between average torque (N·m) and peak value of electric current density in the stator coil 7 (A/mm$^2$) for the Lundell rotary machine according to Embodiment 1 of the present invention and a Lundell rotary machine according to a comparative example for comparison with the Lundell rotary machine according to Embodiment 1, respectively. In the Lundell rotary machine according to the comparative example, permanent magnets are disposed on two axial sides of an magnetic intermediate plate 23, and the permanent magnets 12 are not disposed within range of a thickness of the magnetic intermediate plate 23. The rest of the configuration of the Lundell rotary machine according to the comparative example is identical to the configuration of the Lundell rotary machine according to Embodiment 1.

As shown in FIG. 12, it can be seen that the average torque A of the Lundell rotary machine according to Embodiment 1 is higher than the average torque B of the Lundell rotary machine according to the comparative example even if the peak value of electric current density of the stator coil 7 changes. In particular, it can be seen that when the peak value of the electric current density of the stator coil 7 is 20 A/mm$^2$, the output torque from the Lundell rotary machine according to Embodiment 1 is improved by approximately ten percent compared to the output torque from the Lundell rotary machine according to the comparative example. Thus, it has been confirmed that significant improvements in torque can be achieved in the Lundell rotary machine according to Embodiment 1. Moreover, in a Lundell rotary machine, because magnetic bodies are used in a region of saturation, it is not generally easy to achieve torque improvements of several percent.

Because the rotor core 11 is configured using laminated bodies of magnetic sheets, the occurrence of eddy currents due to fluctuations in the magnetic flux that passes through the rotor core 11 can be suppressed, enabling eddy current loss that arises in the rotor core 11 to be suppressed. Increased efficiency can thereby be further achieved in the Lundell rotary machine.

Because the permanent magnets 12 are supported in a state of contact with the respective first magnetic pole members 24 and second magnetic pole members 25, the magnetic gap is reduced enabling magnetic saturation alleviating effects from the magnets to be increased even using comparatively less expensive ferrite magnets, and since declines in output due magnetic saturation of the rotor 2 are reduced as a result thereof even if large field magnetomotive forces are applied to the field coil 3, the magnetic flux of the permanent magnets 12 can be used effectively, enabling a high-torque motor (rotary machine) to be achieved.

Because the first magnetic pole members 24 and the second magnetic pole members 25 are all supported by the dovetail grooves 41 that are disposed on the holding body 26, and the permanent magnets 12 are supported by the first magnetic pole members 24 and the second magnetic pole members 25, the mechanical strength of the rotor 2 can be increased. Furthermore, because the permanent magnets 12 are not supported by separate special mechanisms that are prepared anew, but rather are supported by components that are necessary for the configuration of the rotor core 11, the need for production of new parts for the Lundell rotary machine is eliminated, enabling reduced costs and superior mass producibility.

Embodiment 2

In Embodiment 1, the respective cross-sectional shapes of the first magnetic pole members 24 and the second magnetic pole members 25 are mutually different than each other at axial end portions and axially intermediate portions, but the respective cross-sectional shapes of the first magnetic pole members 24 and the second magnetic pole members 25 may be identically shaped over an entire axial length.

Figure 13:
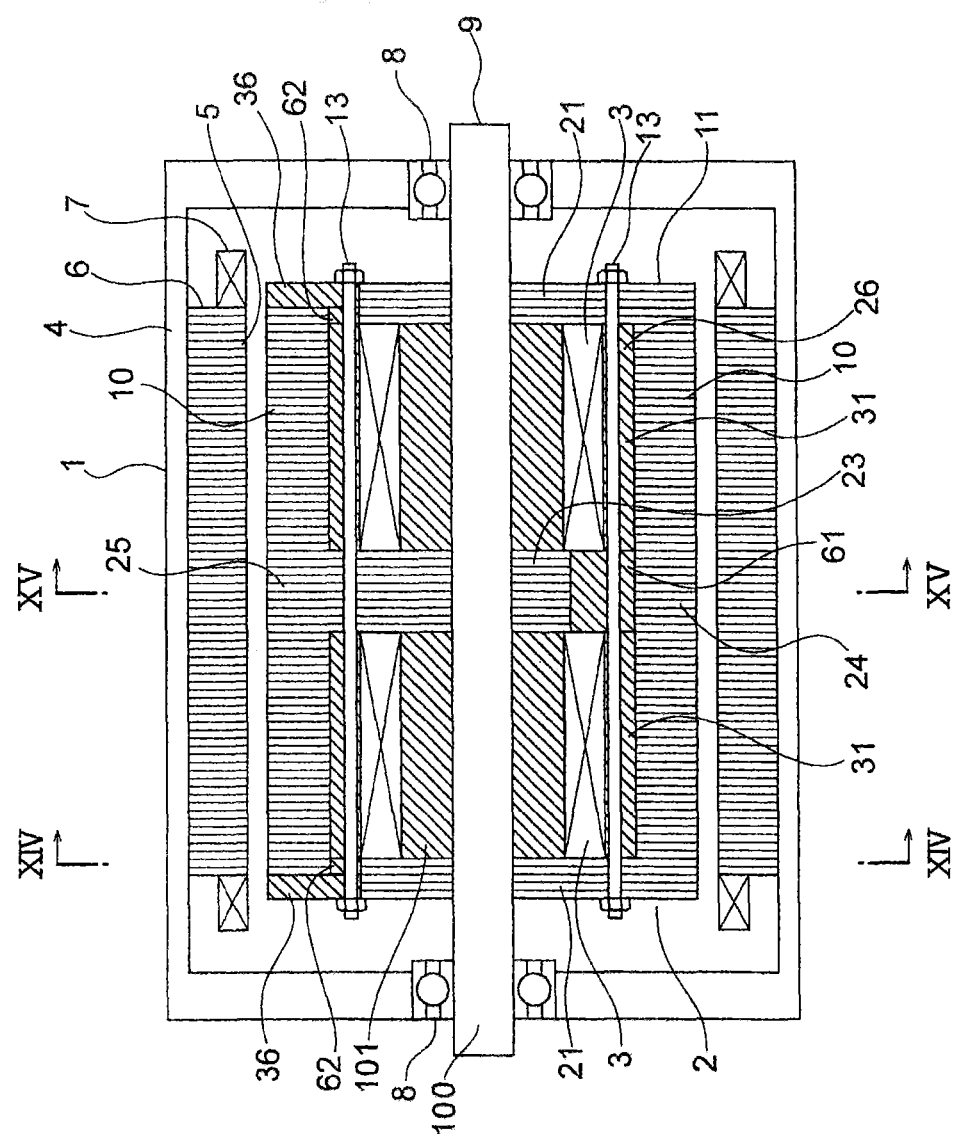
FIG. 13 is a cross section that shows a Lundell rotary machine according to Embodiment 2 of the present invention.
Figure 14:
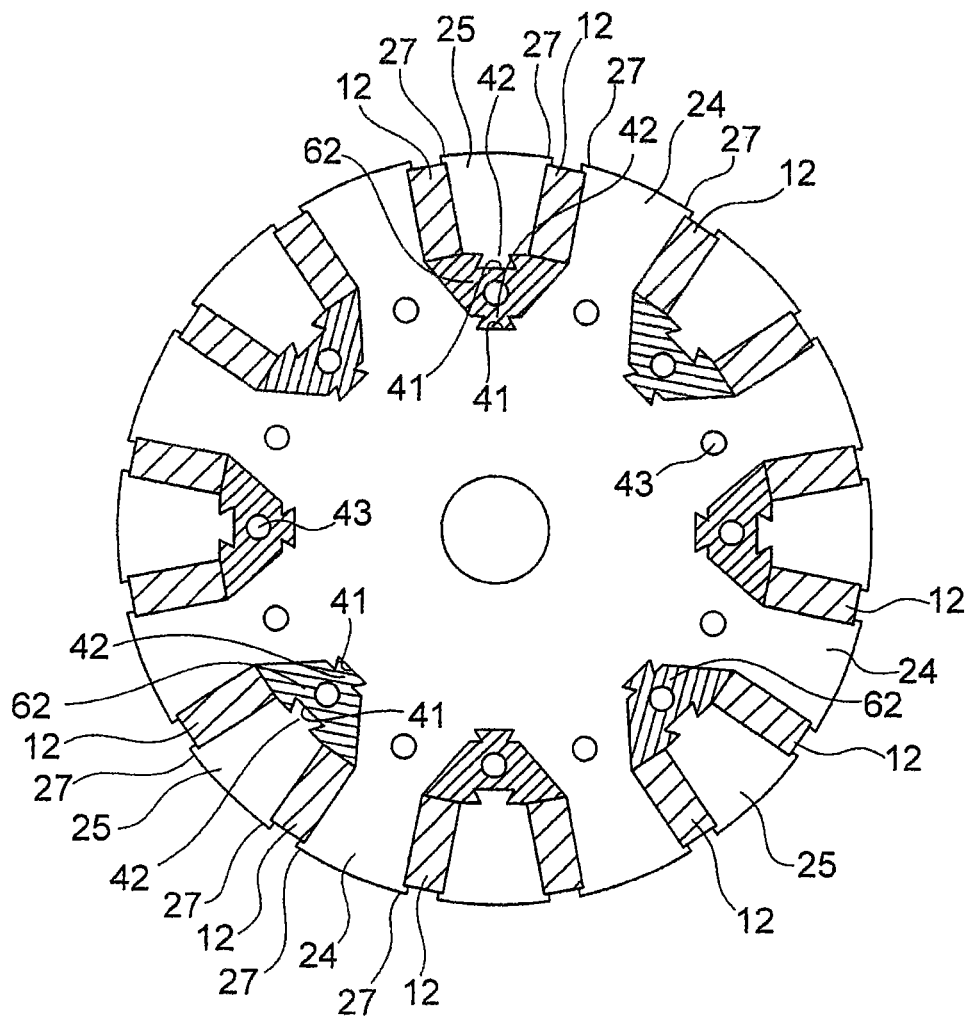
FIG. 14 is a cross section that is taken along Line XIV-XIV in FIG. 13.
Figure 15:
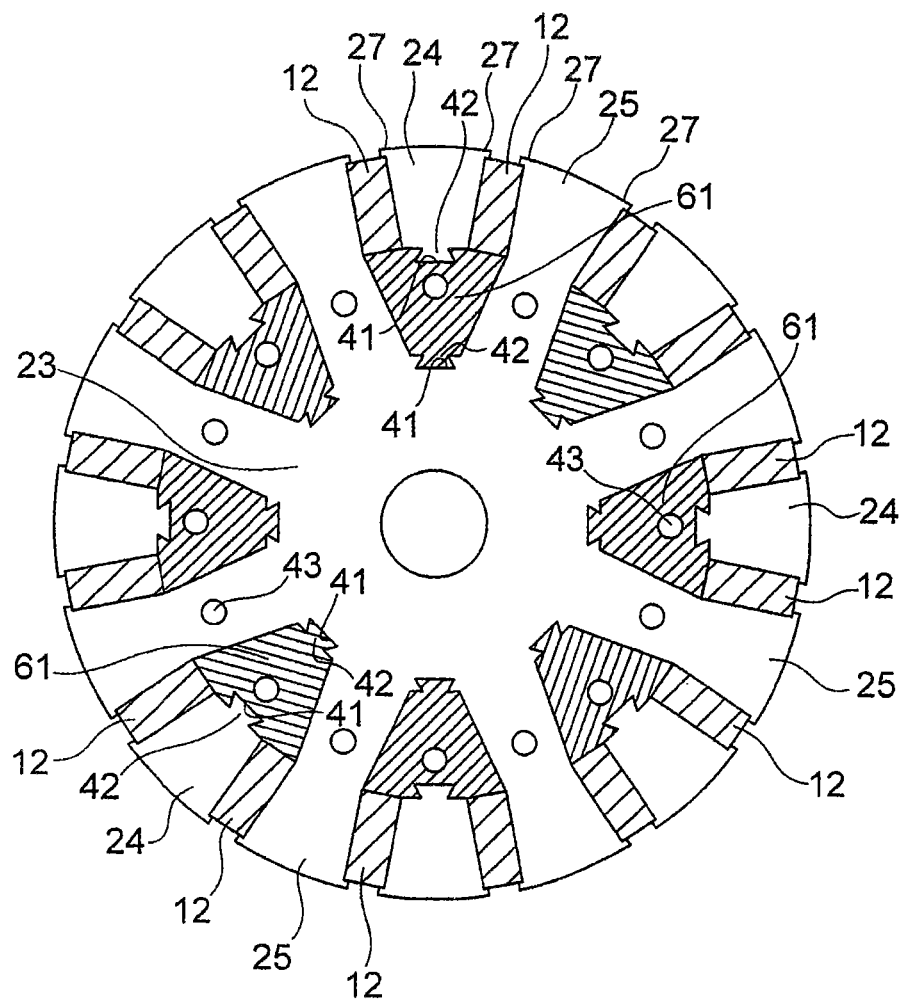
FIG. 15 is a cross section that is taken along Line XV-XV in FIG. 13.

Specifically, FIG. 13 is a cross section that shows a Lundell rotary machine according to Embodiment 2 of the present invention. FIG. 14 is a cross section that is taken along Line XIV-XIV in FIG. 13, and FIG. 15 is a cross section that is taken along Line XV-XV in FIG. 13. A holding body 26 has: a cylindrical nonmagnetic member 31 that is disposed between magnetic end plates 21 and a magnetic intermediate plate 23 in the axial direction; a plurality of nonmagnetic members 61 that are interposed between the magnetic intermediate plate 23 and first magnetic pole members 24 radially; a plurality of nonmagnetic members 36 that are disposed axially outside second magnetic pole members 25; and a plurality of nonmagnetic members 62 that are respectively interposed between the nonmagnetic member 31 and each of the nonmagnetic members 36. The nonmagnetic member 31 and the nonmagnetic member 36 are respectively similar or identical to those of Embodiment 1. The nonmagnetic members 33 through 35 according to Embodiment 1 are not included in the holding body 26 according to Embodiment 2.

Each of the nonmagnetic members 61 and the nonmagnetic member 31 line up in the axial direction such that radially outer portions connect with each other without differences in level. Dovetails 42 that engage with dovetail grooves 41 of the magnetic intermediate plate 23 are disposed on radially inner portions of the nonmagnetic member 61, and dovetail grooves 41 with which dovetails 42 of the first magnetic pole members 24 engage are disposed on radially outer portions of the nonmagnetic member 61. The nonmagnetic member 61 is fixed radially and circumferentially onto the magnetic intermediate plate 23 by engagement of the dovetails 42 of the nonmagnetic member 61 into the dovetail grooves 41 of the magnetic intermediate plate 23, and the first magnetic pole members 24 are fixed radially and circumferentially onto the nonmagnetic member 61 by engagement of the dovetails 42 of the first magnetic pole members 24 into the dovetail grooves 41 of the nonmagnetic member 61.

Each of the nonmagnetic members 62 and the nonmagnetic member 31 line up in the axial direction such that radially outer portions connect with each other without differences in level. Dovetails 42 that engage with dovetail grooves 41 of the magnetic end plates 21 are disposed on radially inner portions of the nonmagnetic member 62, and dovetail grooves 41 with which dovetails 42 of the second magnetic pole members 25 engage are disposed on radially outer portions of the nonmagnetic member 62. The nonmagnetic members 62 are fixed radially and circumferentially onto the magnetic end plates 21 by engagement of the dovetails 42 of the nonmagnetic members 62 into the dovetail grooves 41 of the magnetic end plates 21, and the second magnetic pole members 25 are fixed radially and circumferentially onto the nonmagnetic members 62 by engagement of the dovetails 42 of the second magnetic pole members 25 into the dovetail grooves 41 of the nonmagnetic members 62.

A cross-sectional shape of the first magnetic pole members 24 is an identical shape along an entire axial length. A cross-sectional shape of the second magnetic pole members 25 is also an identical shape along an entire axial length. The rest of the configuration is similar or identical to that of Embodiment 1. It has been confirmed that output torque from a Lundell rotary machine according to Embodiment 2 is also improved in a similar manner to that of Embodiment 1.

In a Lundell rotary machine of this kind, because the respective cross-sectional shapes of the first magnetic pole members 24 and the second magnetic pole members 25 are an identical shape along an entire axial length, a nonmagnetic member 33 for filling differences in level between a nonmagnetic member 31 and a nonmagnetic member 32 can be eliminated, for example, enabling the number of parts that constitute the holding body 26 to be reduced. Cost reductions can thereby be achieved. Production of the first magnetic pole members 24 and the second magnetic pole members 25 can also be facilitated.

Embodiment 3

Figure 16:
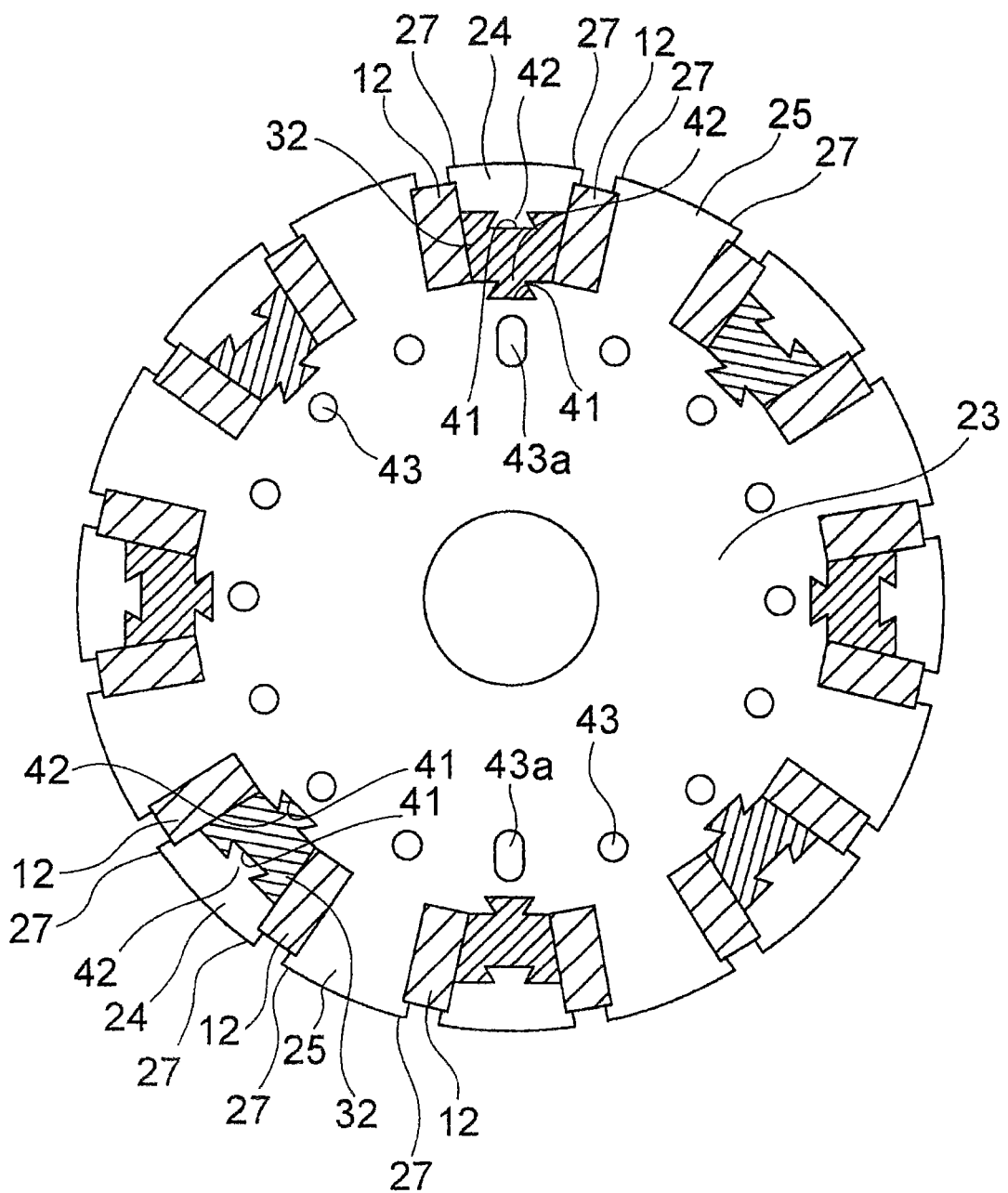
FIG. 16 is a cross section that shows a configuration of a rotor at a position of a magnetic intermediate plate in a Lundell rotary machine according to Embodiment 3 of the present invention.
Figure 17:
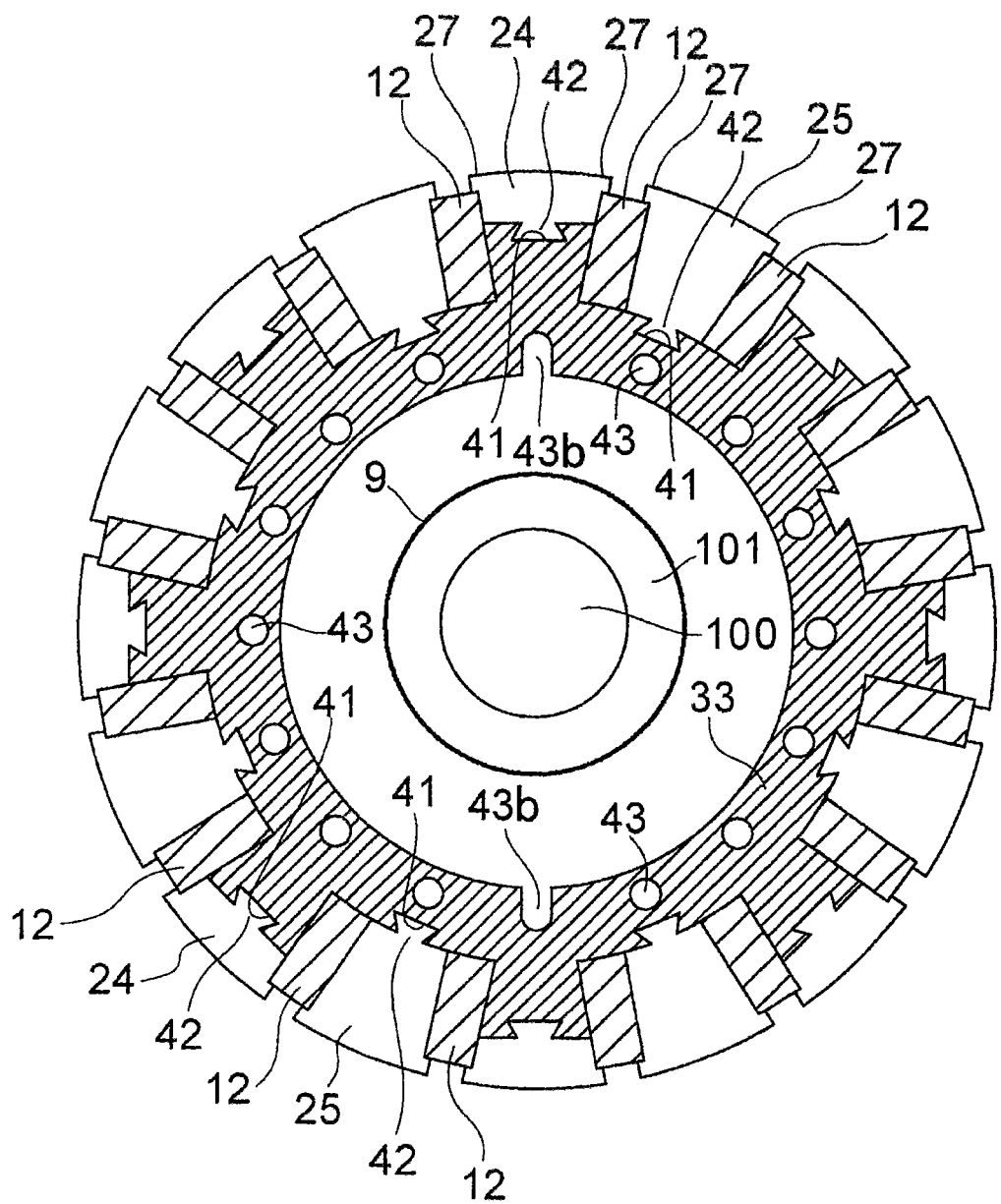
FIG. 17 is a cross section that shows a configuration of the rotor at a position of a nonmagnetic member in the Lundell rotary machine according to Embodiment 3 of the present invention.
Figure 18:
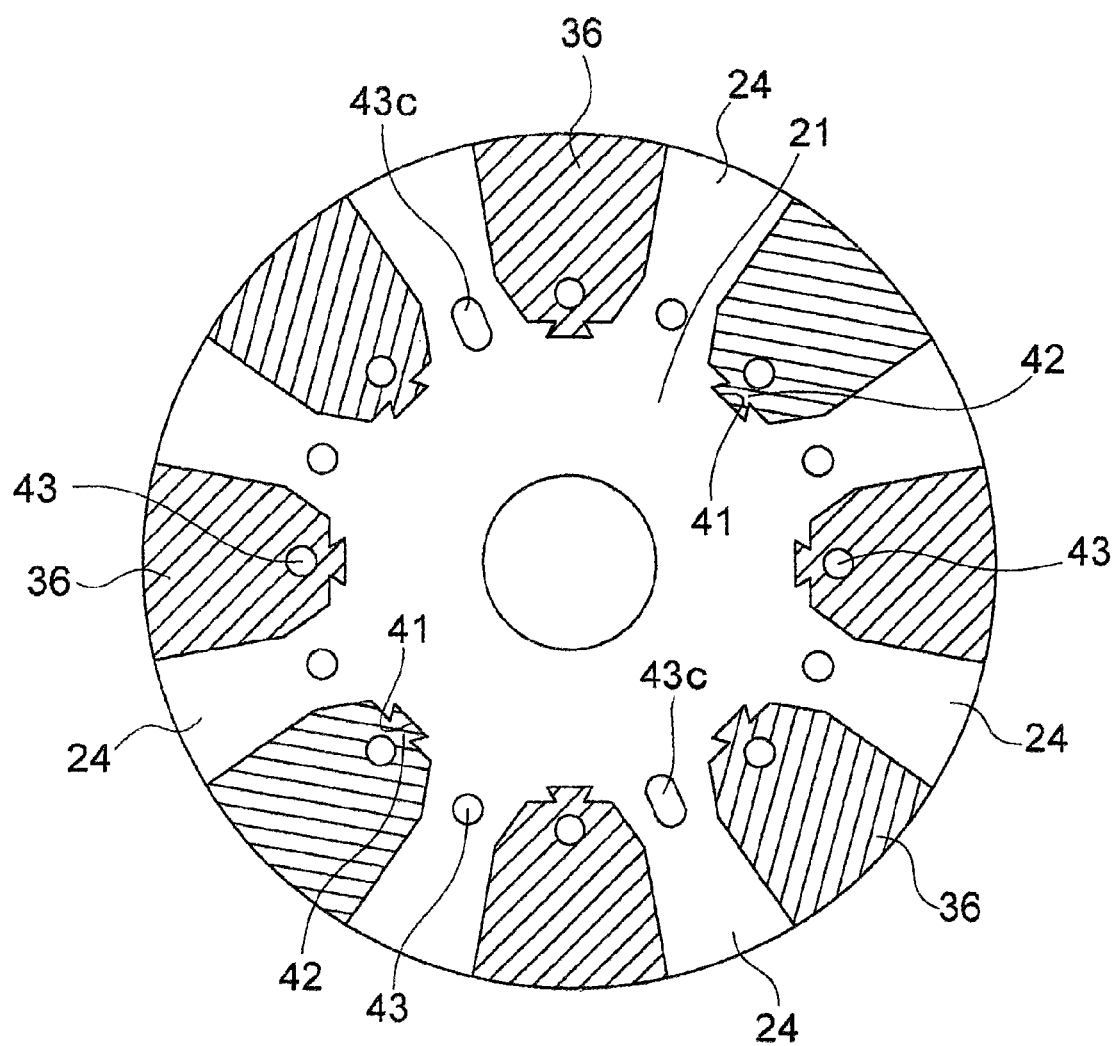
FIG. 18 is a cross section that shows a configuration of the rotor at a position of a first magnetic end plate in the Lundell rotary machine according to Embodiment 3 of the present invention.

FIG. 16 is a cross section that shows a configuration of a rotor 2 at a position of a magnetic intermediate plate 23 in a Lundell rotary machine according to Embodiment 3 of the present invention. FIG. 17 is a cross section that shows a configuration of the rotor 2 at a position of a nonmagnetic member 33 in the Lundell rotary machine according to Embodiment 3 of the present invention. FIG. 18 is a cross section that shows a configuration of the rotor 2 at a position of a first magnetic end plate 23 in the Lundell rotary machine according to Embodiment 3 of the present invention. FIG. 16 is a figure that corresponds to FIG. 8 in Embodiment 1, FIG. 17 is a figure that corresponds to FIG. 7 in Embodiment 1, and FIG. 18 is a figure that corresponds to FIG. 3 in Embodiment 1.

Among a plurality of bolt passage apertures 43 that are disposed on a magnetic intermediate plate 23, at least one is an enlarged passage aperture 43a that is enlarged compared to the other bolt passage apertures 43, as shown in FIG. 16. In this example, among a plurality of bolt passage apertures 43 that are close to respective first magnetic pole members 24, two bolt passage apertures 43 that are at symmetrical positions relative to a shaft axis of the rotating shaft 9 are enlarged passage apertures 43a. Furthermore, in this example, each of the enlarged passage apertures 43a is a slot that extends radially further inward than the other bolt passage apertures 43.

Among a plurality of bolt passage apertures 43 that are disposed on a nonmagnetic member 33, at least one is an open aperture 43b that opens radially inward, as shown in FIG. 17. In this example, two bolt passage apertures 43 that are stacked at positions of each of the enlarged passage apertures 43a of the magnetic intermediate plate 23 in the axial direction are open apertures 43b.

Among a plurality of bolt passage apertures 43 that are disposed on a first magnetic end plate 21 that is close to slip rings, at least one is an enlarged passage aperture 43c that is enlarged compared to the other bolt passage apertures 43, as shown in FIG. 18. In this example, among the plurality of bolt passage apertures 43, two bolt passage apertures 43 that are at symmetrical positions relative to a shaft axis of the rotating shaft 9 are enlarged passage apertures 43c. Furthermore, in this example, each of the enlarged passage apertures 43c is a slot that extends radially further inward than the other bolt passage apertures 43.

Coil lead wires (not shown) that electrically connect slip rings and field coils 3, for supplying electric power to the field coils 3, are passed through each of the enlarged passage apertures 43a and 43c and the open apertures 43b together with fastening bolts 13. The coil lead wires from each of the field coils 3 are thereby connected to the common slip rings. In other words, it is possible for electric power supply to both of the field coils 3 to be performed from one direction only.

Now, in the above example, the bolt passage apertures 43 that are close to the first magnetic pole members 24 are made into the enlarged passage apertures 43a. The bolt passage apertures 43 that are close to the second magnetic pole members 25 may be made into enlarged passage apertures, but since bolt passage apertures 43 that are disposed on thin portions of the nonmagnetic member 33 become open apertures if the bolt passage apertures 43 that are close to the second magnetic pole members 25 are made into enlarged passage apertures, it is desirable for the bolt passage apertures 43 that are close to the first magnetic pole members 24 to be made into the enlarged passage apertures 43a.

Moreover, in the above example, the number of enlarged passage apertures 43a, enlarged passage apertures 43c, and open apertures 43b is two each, but the number of enlarged passage apertures 43a, enlarged passage apertures 43c, and open apertures 43b may be one, or may be three or more.

In the above example, the enlarged passage apertures 43a and 43c and the open apertures 43b through which the coil lead wires and the fastening bolts 13 are passed together are formed by enlarging the bolt passage apertures 43, but coil wire passage apertures that allow passage of the coil lead wires may be formed separately from the bolt passage apertures 43 on each of the magnetic intermediate plate 23, the magnetic end plates 21, and the nonmagnetic member 33.

Embodiment 4

Figure 19:
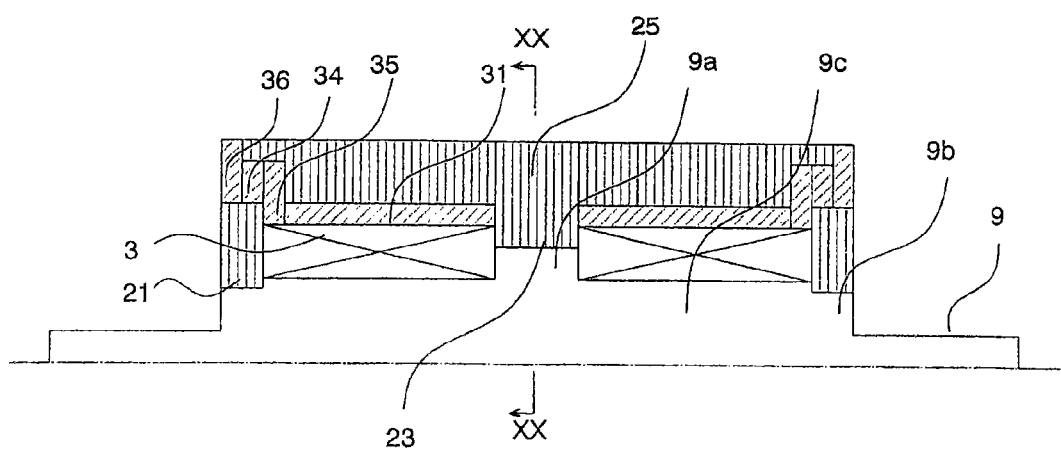
FIG. 19 is a partial longitudinal cross section that shows a rotor of a Lundell rotary machine according to Embodiment 4 of the present invention.

FIG. 19 is a partial longitudinal cross section that shows a rotor of a Lundell rotary machine according to Embodiment 4 of the present invention. In Embodiments 1 through 3, the rotating shaft main body 100 and each of the internal magnetic members 101 are separate members, but the rotating shaft main body 100 and each of the internal magnetic members 101 may combined into a single integrated member. In the figure, an outer circumferential surface of a rotating shaft 9 has: an intermediate plate insertion portion 9a that fits inside a magnetic intermediate plate 23; a pair of end plate insertion portions 9b that respectively fit inside respective magnetic end plates 21; and a pair of coil insertion portions 9c that respectively fit inside respective field coils 3 so as to be interposed between each of the end plate insertion portions 9b and the intermediate plate insertion portion 9a. An outside diameter of the intermediate plate insertion portion 9a is greater than an outside diameter of the coil insertion portions 9c, and the outside diameter of the coil insertion portions 9c is greater than the outside diameter of the end plate insertion portions 9b. Consequently, differences in level are formed between the intermediate plate insertion portion 9a and the coil insertion portions 9c, and differences in level are formed between the coil insertion portions 9c and the end plate insertion portions 9b. Each of the field coils 3 is thereby more easily fixed onto the rotating shaft 9 in the axial direction, facilitating the operation of assembling the rotor 2.

Figure 20:
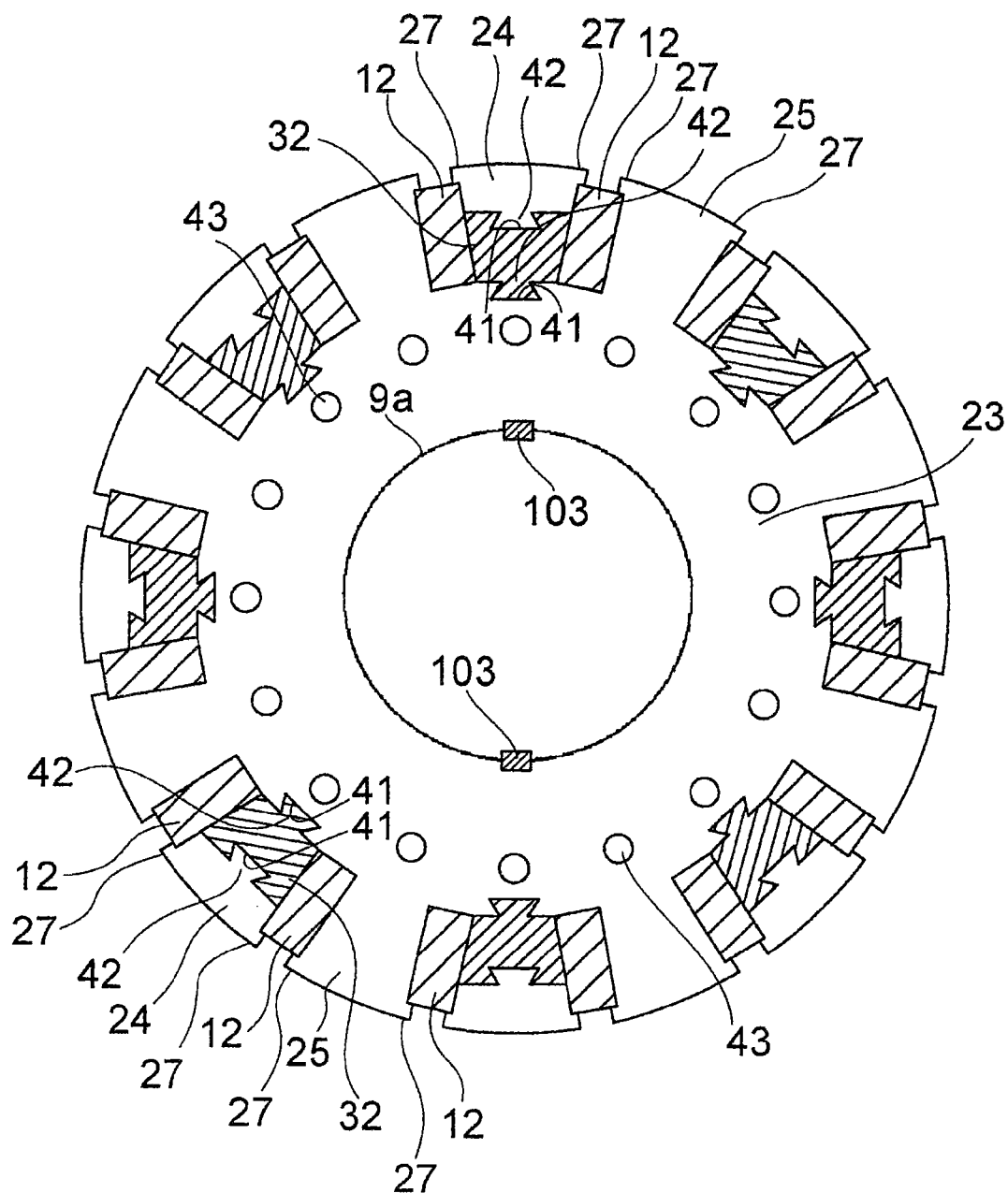
FIG. 20 is a cross section that is taken along Line XX-XX in FIG. 19.

FIG. 20 is a cross section that is taken along Line XX-XX in FIG. 19. Two keyways are disposed on an inner circumferential surface of the magnetic intermediate plate 23 and two keyways are disposed on an outer circumferential surface of the intermediate plate insertion portion 9a. Keys 103 are inserted into two key insertion apertures that are formed by the mutually facing keyways. The magnetic intermediate plate 23 and the rotating shaft 9 are thereby fixed to each other circumferentially. Similarly, keyways that are respectively disposed on inner circumferential surfaces of the magnetic end plates 21 and an outer circumferential surface of the end plate insertion portions 9b face each other to form two key insertion apertures, and the magnetic end plates 21 and the rotating shaft 9 are also fixed to each other circumferentially by inserting keys into the key insertion apertures.

Moreover, in the above example, the magnetic intermediate plate 23 and the magnetic end plates 21 are fixed onto the rotating shaft 9 by inserting the keys into the key insertion apertures, but are not limited thereto, and the magnetic intermediate plate 23 and the magnetic end plates 21 may be fixed onto the rotating shaft 9 by press-fitting or shrinkage fitting, for example.

Embodiment 5

Figure 21:
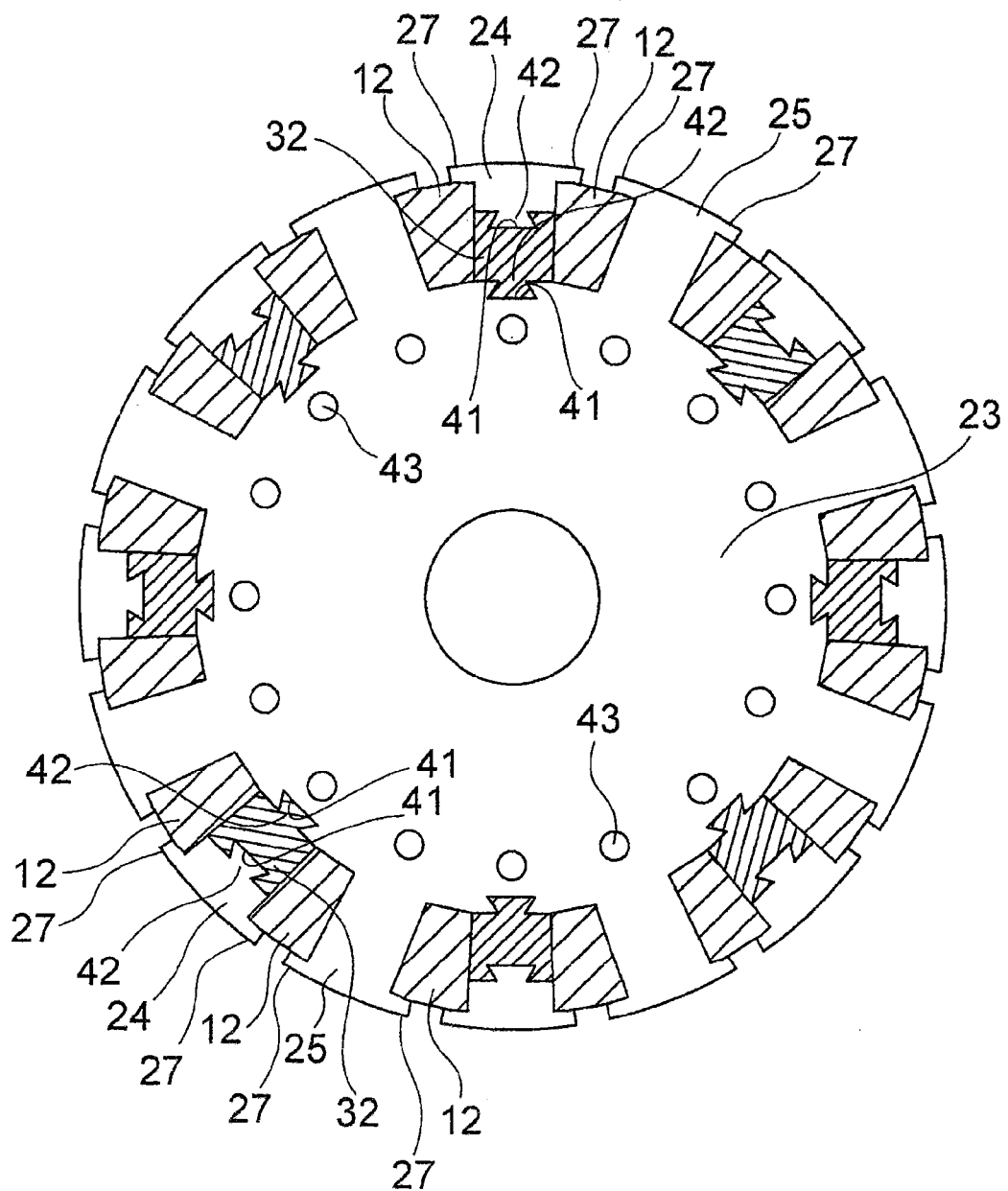
FIG. 21 is a cross section that shows a rotor of a Lundell rotary machine according to Embodiment 5 of the present invention.

FIG. 21 is a cross section that shows a rotor of a Lundell rotary machine according to Embodiment 5 of the present invention. Moreover, FIG. 21 is a figure that corresponds to FIG. 8 in Embodiment 1. In Embodiments 1 through 4, width dimensions (dimensions in a circumferential direction) of the permanent magnets 12 are identical at any radial position, but are not limited thereto, and the width dimensions of the permanent magnets 12 may widen continuously toward a radially outer side, as shown in FIG. 21. In FIG. 21, the side surfaces of mutually adjacent permanent magnets 12 are parallel to the radial direction. Thus, the magnetic flux of each of the permanent magnets 12 can be used more effectively, enabling torque to be improved.

Embodiment 6

Figure 22:
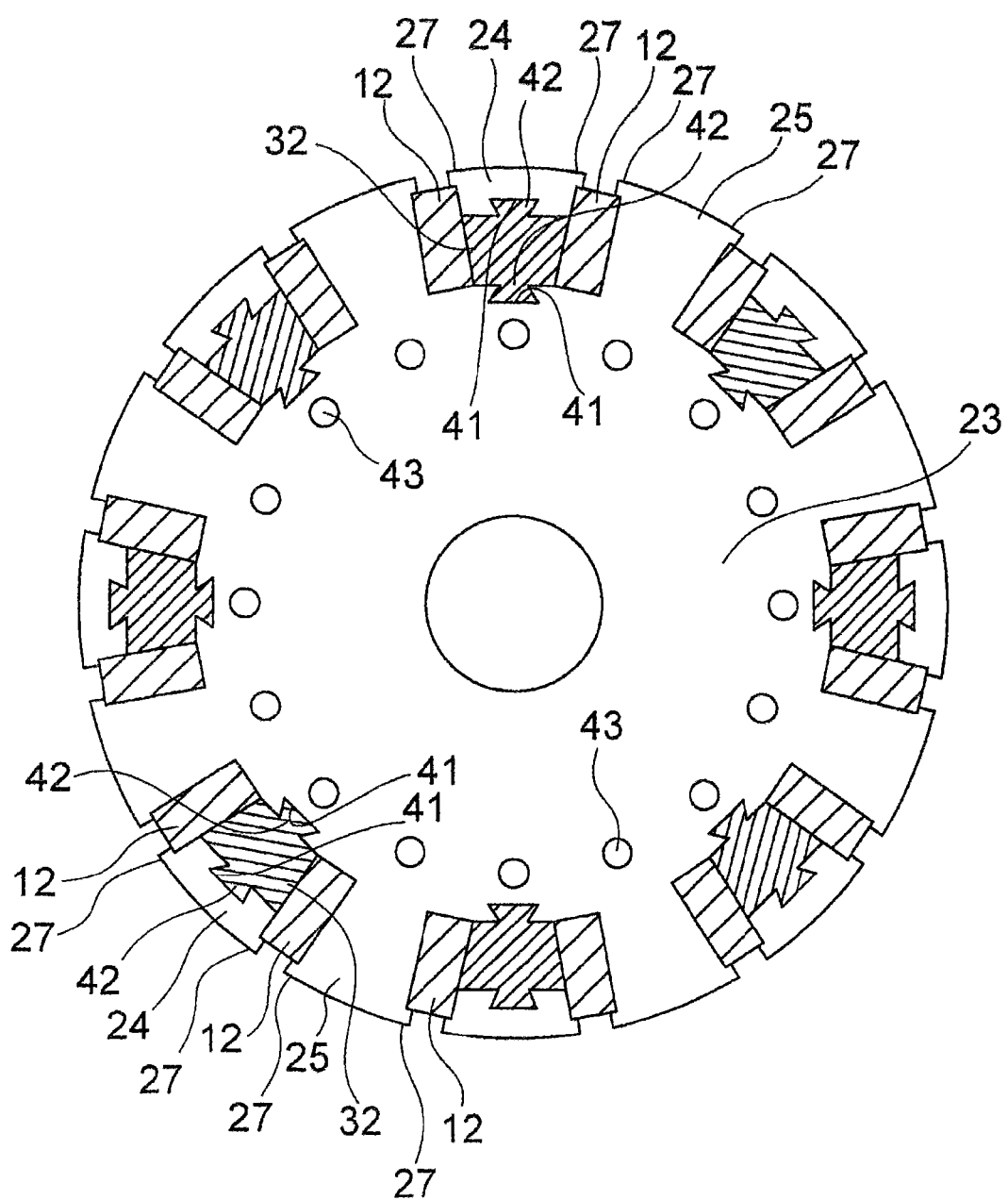
FIG. 22 is a cross section that shows a rotor of a Lundell rotary machine according to Embodiment 6 of the present invention.

FIG. 22 is a cross section that shows a rotor of a Lundell rotary machine according to Embodiment 6 of the present invention. Moreover, FIG. 22 is a figure that corresponds to FIG. 8 in Embodiment 1. In Embodiments 1 through 5, among two members that are engaged with each other by dovetails 42 and dovetail grooves 41, the dovetails 42 are disposed on the member that is on a radially outer side, and the dovetail grooves 41 are disposed to the member that is on a radially inner side, but are not limited thereto.

As shown in FIG. 22, for example, the dovetails 42 may be disposed on respective portions on a radially inner and a radially outer side of the nonmagnetic member 32, and dovetail grooves 41 that engage with the dovetails 42 individually may be disposed both on the magnetic intermediate plate 23, which is radially further inward than the nonmagnetic member 32, and on the first magnetic pole members 24, which are radially further outward than the nonmagnetic member 32.

Figure 23:
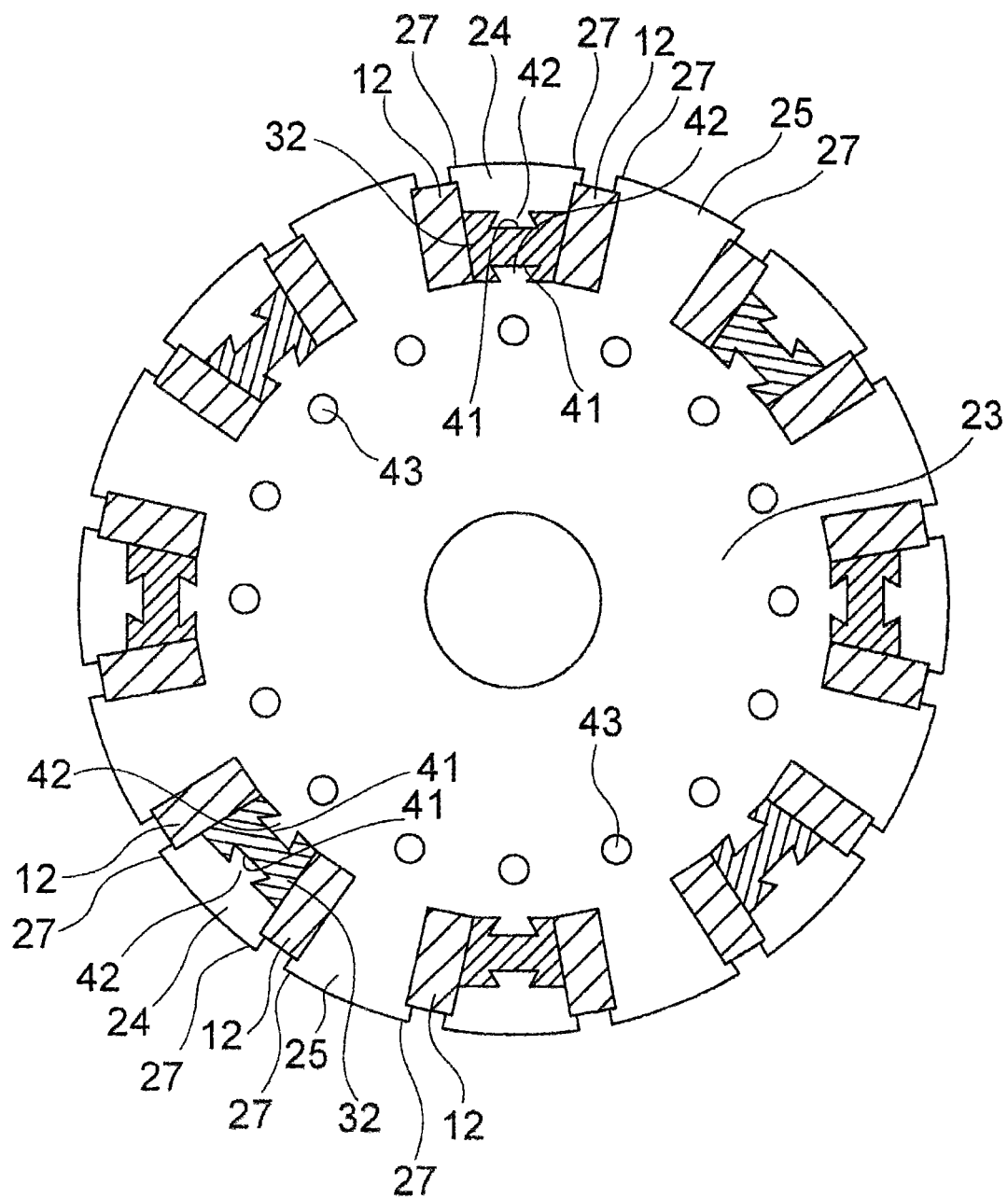
FIG. 23 is a cross section that shows a variation of the rotor of the Lundell rotary machine according to Embodiment 6 of the present invention.

As shown in FIG. 23, the dovetail grooves 41 may be disposed on respective portions on a radially inner and a radially outer side of the nonmagnetic member 32, and dovetails 42 that engage with the dovetail grooves 41 individually may be disposed both on the magnetic intermediate plate 23, which is radially further inward than the nonmagnetic member 32, and on the first magnetic pole members 24, which are radially further outward than the nonmagnetic member 32.

Figure 24:
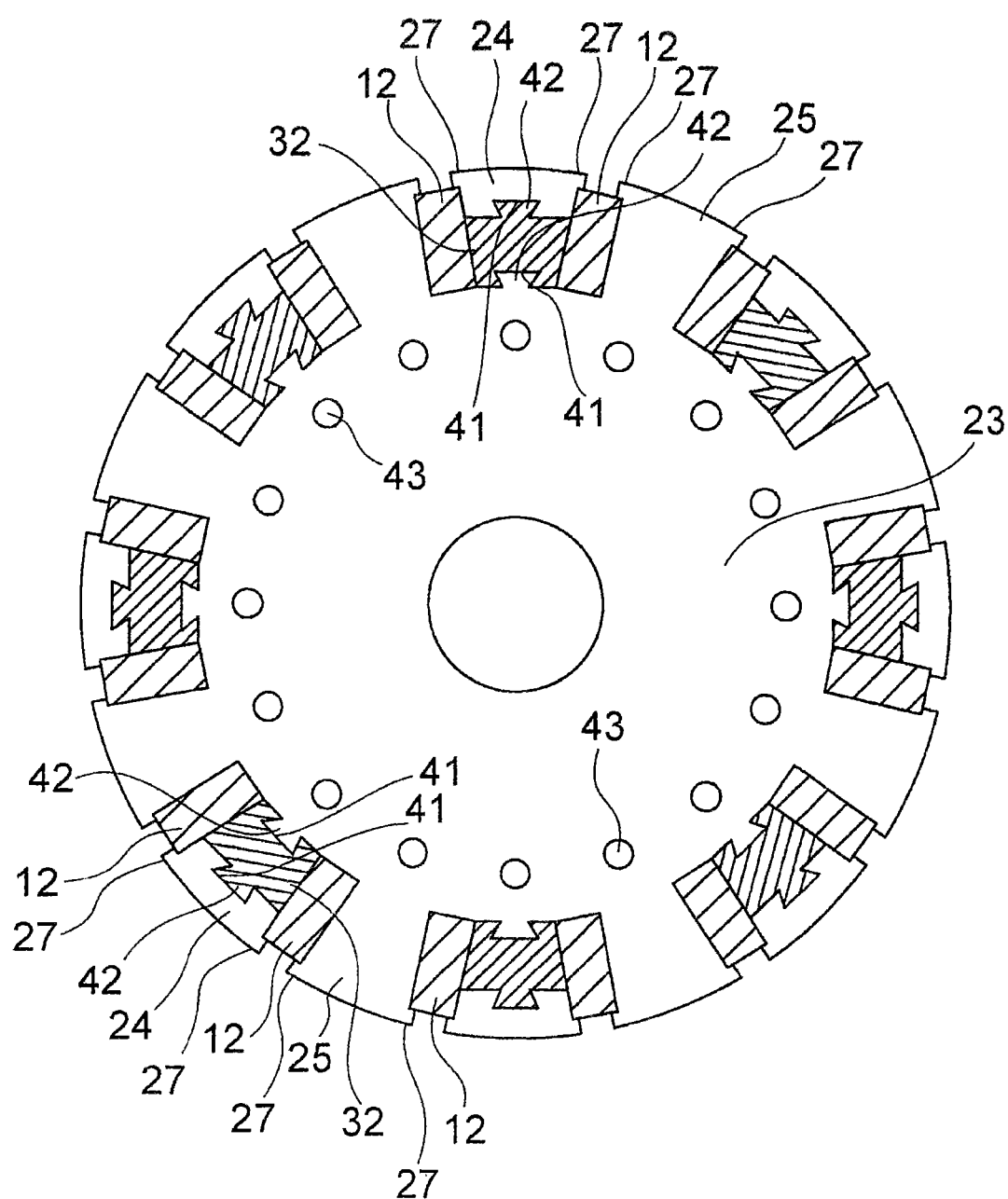
FIG. 24 is a cross section that shows a variation of the rotor of the Lundell rotary machine according to Embodiment 6 of the present invention.

In addition, as shown in FIG. 24, dovetail grooves 41 may be disposed on radially inner portions of the nonmagnetic member 32, and dovetails 42 disposed on radially outer portions on the nonmagnetic member 32, and dovetails 42 that engage with the dovetail grooves 41 of the nonmagnetic member 32 disposed on the magnetic intermediate plate 23, which is radially further inward than the nonmagnetic member 32, and dovetail grooves 41 that engage with the dovetails 42 of the nonmagnetic member 32 disposed on the first magnetic pole members 24, which are radially further outward than the nonmagnetic member 32.

Moreover, the Lundell rotary machines that are explained above by way of illustration are embodiments that are shown simply as examples, and when implementing the present invention, many kinds of variations are possible, and features of the respective specific examples can be used wholly or selectively in combination with each other.

EXPLANATION OF NUMBERING

1 STATOR, 2 ROTOR, 3 FIELD COIL, 5 STATOR MAGNETIC POLE, 10 ROTOR MAGNETIC POLE, 12 PERMANENT MAGNET, 21 MAGNETIC END PLATE, 23 MAGNETIC INTERMEDIATE PLATE, 24 FIRST MAGNETIC POLE MEMBER, 25 SECOND MAGNETIC POLE MEMBER, 26 HOLDING BODY, 41 DOVETAIL GROOVE.

The invention claimed is:
1. A Lundell rotary machine comprising:
a tubular stator that has stator magnetic poles;
a rotor that has rotor magnetic poles that face the stator magnetic poles and that can be coupled magnetically, and that is rotated relative to the stator inside the stator; and
a pair of magnetic field coils that are disposed radially inside the rotor magnetic poles, and that generate magnetic flux inside the stator and inside the rotor, wherein the rotor includes:
a pair of first and second magnetic end plates that are disposed so as to be separated from each other in an axial direction;
a magnetic intermediate plate that is disposed between the pair of magnetic end plates in the axial direction, and that is also disposed between the pair of field coils in the axial direction;
a plurality of first magnetic pole members that extend axially, and that are disposed so as to be spaced apart circumferentially from each other such that first end portions and second end portions are respectively coupled magnetically and mechanically to the first magnetic end plate and to the second magnetic end plate and so as to be separated from the magnetic intermediate plate magnetically;
a plurality of second magnetic pole members that extend axially, that are disposed so as to be spaced apart circumferentially from each other such that intermediate portions are coupled magnetically and mechanically to the magnetic intermediate plate and so as to be separated from each of the magnetic end plates magnetically, that are respectively inserted between the first magnetic pole members, and that constitute the rotor magnetic poles together with the first magnetic pole members;
a plurality of permanent magnets that are respectively disposed between the first magnetic pole members and the second magnetic pole members in a circumferential direction such that first end portions extend to the first magnetic end plate and second end portions extend to the second magnetic end plate; and a nonmagnetic holding body for separating the first magnetic pole members magnetically from the magnetic intermediate plate, and for separating the second magnetic pole members magnetically from the magnetic end plates.

2. The Lundell rotary machine according to claim 1, wherein the magnetic intermediate plate, the first magnetic pole members, and the second magnetic pole members are each constituted by a laminated body of a plurality of magnetic sheets that are laminated in the axial direction.

3. The Lundell rotary machine according to claim 1, wherein the permanent magnets are supported in a state of contact with each of the first magnetic pole members and the second magnetic pole members.

4. The Lundell rotary machine according to claim 1, wherein:

the first magnetic pole members and the second magnetic pole members are each supported by a dovetail groove that is formed in the axial direction on an outer circumference of the holding body; and the permanent magnets are supported by the first magnetic pole members and the second magnetic pole members.

5. The Lundell rotary machine according to claim 1, wherein a cross-sectional shape of each of the first magnetic pole members and the second magnetic pole members is an identical shape along an entire axial length.

6. The Lundell rotary machine according to claim 1, wherein an aperture that allows passage of a coil lead wire for supplying electric power to the field coils is disposed on the magnetic intermediate plate.

\* \* \* \* \*